US011881663B2

(12) United States Patent
Wimmer et al.

(10) Patent No.: US 11,881,663 B2
(45) Date of Patent: Jan. 23, 2024

(54) ELECTRICAL PLUG CONNECTOR, ELECTRICAL PLUG CONNECTOR ASSEMBLY, AND ELECTRICAL PLUG CONNECTION

(71) Applicant: Rosenberger Hochfrequenztechnik Gmbh & Co. KG, Fridolfing (DE)

(72) Inventors: Martin Wimmer, Palling (DE); Rong Fang, Freilassing (DE); Jonathan Vinke, Teisendorf (DE); Josef Krautenbacher, Fridolfing (DE); Andreas Wallner, Kirchanschoering (DE)

(73) Assignee: Rosenberger Hochfrequenztechnik GmbH & Co. KG, Fridolfing (DE)

( * ) Notice: Subject to any disclaimer, the term of this patent is extended or adjusted under 35 U.S.C. 154(b) by 0 days.

(21) Appl. No.: 17/717,498

(22) Filed: Apr. 11, 2022

(65) Prior Publication Data

US 2022/0376447 A1 Nov. 24, 2022

(30) Foreign Application Priority Data

May 19, 2021 (EP) .................................... 21174634

(51) Int. Cl.
*H01R 24/56* (2011.01)
*H01R 9/05* (2006.01)

(52) U.S. Cl.
CPC ......... *H01R 24/564* (2013.01); *H01R 9/0524* (2013.01)

(58) Field of Classification Search
CPC H01R 9/0521; H01R 2103/00; H01R 9/0524; H01R 24/564
See application file for complete search history.

(56) References Cited

U.S. PATENT DOCUMENTS 3,671,926 A * 6/1972 Zdenek Nepovim .... H01R 9/05 439/584
5,267,877 A 12/1993 Scannelli
(Continued)

FOREIGN PATENT DOCUMENTS

DE 4344328 C1 1/1995

OTHER PUBLICATIONS

European Search Report dated Nov. 11, 2021.

*Primary Examiner* — Jean F Duverne
(74) *Attorney, Agent, or Firm* — Randall Danskin P.S.

(57) ABSTRACT

An electrical plug connector for a cable has a compression sleeve and a stop element that is axially adjacent to and connected to the compression sleeve. The compression sleeve has an inner lateral surface thread that is screwable to an outer lateral surface thread of an outer conductor of the cable. The outer conductor is clampable between the compression sleeve and an axial end region of the stop element, and in an assembled state, a longitudinal axis of the compression sleeve, is tilted relative to a longitudinal axis of the stop element; or b) a normal vector of a plane spanned by an edge between an end face and an inner lateral surface of the stop element is rotated by orientation angle ($\varphi_A$) relative to the longitudinal axis of the compression sleeve; or c) the edge has a helical course in a longitudinal axis direction of the plug connector.

19 Claims, 9 Drawing Sheets

(56) References Cited

U.S. PATENT DOCUMENTS

| | | | | | |
|---|---|---|---|---|---|
| 5,334,051 | A * | 8/1994 | Devine | H01R 24/564 | 439/583 |
| 5,766,037 | A * | 6/1998 | Nelson | H01R 24/564 | 439/583 |
| 6,019,635 | A | 2/2000 | Nelson | | |
| 8,287,309 | B1 * | 10/2012 | Thomas | H01R 9/0524 | 439/578 |
| 9,172,156 | B2 | 10/2015 | Nugent | | |
| 2006/0014425 | A1 * | 1/2006 | Montena | H01R 24/40 | 439/578 |
| 2013/0143439 | A1 | 6/2013 | Nugent | | |

* cited by examiner

ELECTRICAL PLUG CONNECTOR, ELECTRICAL PLUG CONNECTOR ASSEMBLY, AND ELECTRICAL PLUG CONNECTION

CROSS-REFERENCE TO RELATED APPLICATIONS

This US National Stage Non-Provisional Patent Application claims priority to earlier filed European Patent Application No. 21 174 634.2 which was filed on 19 May 2021. The entire contents of the aforementioned earlier filed European Patent Application is expressly and fully incorporated herein by this reference.

Pursuant to USPTO rules, this priority claim to earlier filed European Patent Application No. 21 174 634.2 which was filed on 19 May 2021 is also included in the Application Data Sheet (ADS) filed herewith.

FIELD OF INVENTION

The present invention relates to an electrical plug connector. The present invention additionally relates to an electrical plug connector assembly. The present invention lastly relates to an electrical plug connection.

TECHNICAL BACKGROUND

In order to transmit high-frequency signals over long cable distances, for example only, and not limited to, aerial masts for cellular radio stations or for other transmitting and receiving systems, a high shielding attenuation and a high load-bearing capacity are required. The requirement of low transmission loss and high load can be met with a large cable diameter, particularly in the cm range, and with the use of foamed polyethylene for the dielectric. A very good shielding attenuation is achieved with a closed metal tube as outer conductor. So that a cable of this kind can additionally be bent as it is laid, the outer conductor, and possibly also the inner conductor, are each embodied as a corrugated metal tube. A cable of this kind is thus often referred to as a "corrugated cable".

A "corrugated cable" of this kind is typically connected on-site to a suitable coaxial plug connector. A coaxial plug connector of this kind for a "corrugated cable" is therefore also referred to as a field-installable plug connector. For example, U.S. Pat. No. 9,172,156 B2 describes an electrical plug connector assembly formed of a field-installable coaxial plug connector of this kind and a coaxial "corrugated cable".

The cable is connected to the plug connector on-site using a suitable mechanically, hydraulically, pneumatically or electrically operating tool, which compresses the cable with the plug connector from the side of the inner conductor and from the side of the outer conductor. To this end, the axial end of the rigid cable inner conductor is pressed into an inner conductor contact element of the plug connector in the form of a socket and the axial end of the cable outer conductor pipe is pressed between a stop element and a compression sleeve of the plug connector. A plug connector of this kind is also referred to as a compression connector on account of the compression of cable and plug connector. Alternatively, it is also possible to screw the cable and plug connector to one another.

The stop element, as a component of the plug connector outer conductor, is made of a metal material, and the compression sleeve can be produced from a metal or a non-metal material. The inner conductor contact is substantially a radial contact, whereas the outer conductor contact is preferably a contact with an axial and a radial component.

The cable, which comprises an outer conductor with an outer lateral surface shaped in the form of a thread, is screwed into the compression sleeve of the plug connector, which to this end has an inner lateral surface shaped in the form of a thread corresponding to the outer lateral surface of the cable outer conductor shaped in the form of a thread. The thread path on the outer lateral surface of the cable outer conductor and correspondingly on the inner lateral surface of the compression sleeve has a specific pitch angle in each case.

Even if the end face of the compression sleeve directed towards the stop element and the end face of the stop element directed towards the compression sleeve are each oriented perpendicularly to the longitudinal axis of the electrical plug connector assembly, the last turn of the thread path at the axial end of the thread, on account of the pitch angle along its 360° extent, has a changing axial distance from the opposite end face of the stop element. The axial end of the cable outer conductor clamped between the stop element and the compression sleeve therefore experiences a different clamping force along the pressing zone extending over 360°. The contact force between the cable outer conductor and the stop element is therefore not constant along the pressing zone.

This may lead, disadvantageously, to the formation of undesirable passive intermodulations in the contact region, on the outer conductor side, between cable and plug connector. In addition, the axial end of the cable outer conductor, in the angular segment of the contact region in which the contact pressure is lower on account of the pitch angle of the thread, may be clamped more loosely and therefore may protrude in part into the elastic region of the dielectric, which is typically produced from foamed polyethylene. The transmission characteristic of the high-frequency signal path is therefore more capacitive at this point. An imperfection of this kind in the impedance of the high-frequency signal path leads disadvantageously to reflections of the high-frequency signal.

This is a condition that requires improvement.

BACKGROUND OF THE INVENTION

Against this background, the object of the present invention is to describe an electrical plug connector for a "corrugated cable", which plug connector has optimized electrical transmission properties, in particular optimized high-frequency transmission properties.

An electrical plug connector for a cable, having a compression sleeve and a stop element, and wherein the stop element is arranged axially adjacently to the compression sleeve in an insertion direction of the electrical plug connector and is connected to the compression sleeve (preferably indirectly, for example via a further housing component of the plug connector, such as an outer conductor contact element, or directly, in particular in an assembled state of the plug connector), and wherein the compression sleeve has an inner lateral surface shaped in the form of a thread, which inner lateral surface is designed to be screwable to an outer lateral surface, shaped in the form of a thread, of an outer conductor of the cable, and wherein the connection between the compression sleeve and stop element is designed in such a way that an axial end of the outer conductor is clampable between an axial end region of the compression sleeve adjacent to the contact element and an axial end region of the stop element adjacent to the compression sleeve, and that, _a)_in an assembled state of the plug connector and of the cable, a longitudinal axis of the compression sleeve, at least in the axial end region of the compression sleeve, is tilted by a tilt angle relative to a longitudinal axis of the stop element at least in the axial end region of the stop element and/or b) a normal vector of a plane which is spanned by an edge between an end face and an inner lateral surface of the stop element is rotated by an orientation angle relative to the longitudinal axis of the compression sleeve, and/or c) the edge has a helical course in a longitudinal axis direction of the plug connector.

The finding/concept forming the basis of the present invention lies in shaping the stop face of the stop element, against which the axial end of the cable outer conductor is pressed with the compression sleeve in the assembled state of the plug connector and of the cable, such that the foremost turn, opposite the stop element, of the internal thread formed in the compression sleeve runs parallel, to the greatest possible extent, to the stop face of the stop element over the largest possible angular segment of the sleeve-like circumference.

To this end, in a first embodiment of the invention, in the assembled state of the plug connector and of the cable, a longitudinal axis of the compression sleeve, at least in the axial end region of the compression sleeve, is tilted by a tilt angle relative to a longitudinal axis of the stop element at least in the axial end region of the stop element. In a second embodiment of the invention, in the assembled state of the plug connector and the cable, a normal vector of a plane which is spanned by an edge between an end face and an inner lateral surface of the stop element is rotated by an orientation angle relative to the longitudinal axis of the compression sleeve. In a third embodiment of the invention, in the assembled state of the plug connector, the edge between the end face and the inner lateral surface of the stop element runs helically on the longitudinal axis direction of the plug connector.

The stop element and the compression sleeve are each a preferably sleeve-soaped body. The axial end region of the compression sleeve and the axial end region of the stop element is therefore in each case preferably a sleeve-shaped body. A longitudinal axis of the stop element, of the compression sleeve and of the axial end region of the stop element or the compression sleeve therefore runs along the centre of rotation of the particular element or the particular end region. A normal vector of a plane or any other surface shall be understood here and hereinafter to mean a vector which has an orientation perpendicular to the extent of the plane or the surface.

In the non-tilted case and with the constant orientation of the axial end faces of stop element and compression sleeve in accordance with the prior art, only one point along the entire circumference of the foremost turn of the compression sleeve is arranged closest to the stop element. The cable outer conductor is thus optimally clamped between the stop element and the compression sleeve and thus realizes an optimal contact pressure only at a single point of the circumference. By contrast, in the case of the invention, the optimal clamping of the cable cuter conductor in the plug connector outer conductor and thus the formation of an optimal contact pressure between the cable outer conductor and the plug connector outer conductor is advantageously realized over a larger angular segment, preferably at least over half a turn of the thread and at best over the entire turn of the thread. The occurrence of passive intermodulations and of impedance disturbances in the transition between the cable and the plug connector can thus be significantly minimized.

The essential components of the plug connector are the compression sleeve and the stop element. Here and hereinafter, a stop element shall be understood to mean an element formed from an electrically conductive material, preferably from a metal material, within the plug connector with a stop face against which the cable outer conductor is pressed, in such a way that a reliable electrical contact and a reliable shielding transfer between the cable outer conductor in the outer conductor contact element of the plug connector are provided. Here and hereinafter, a compression sleeve shall be understood to mean in particular an element which, with its axial end region, presses the axial end of the cable outer conductor against the stop face of the stop element.

The cable is connected to the compression sleeve via a screw connection. The thread of the screw connection formed on the compression sleeve and corresponding to the outer conductor of the cable can be left-handed or right-handed. The thread is preferably formed as a round thread. A design as a flat thread, buttress thread, sharp thread, trapezoidal thread or Whitworth thread (conical thread) is also conceivable.

The cable is screwed into the compression sleeve at least as far as the axial end of the compression sleeve. It is also conceivable that the cable and therefore the outer conductor of the cable is screwed into the compression sleeve beyond the axial end compression sleeve.

In the assembled state of the plug connector and of the cable, the axial end region of the compression sleeve is pressed against the axial end region of the stop element in such a way that the axial end of the cable outer conductor is clamped between the compression sleeve and the stop element. Here, the axial end of the cable outer conductor is preferably clamped fully between the tooth flank face of the foremost turn of the internal thread formed in the compression sleeve and the stop face formed oppositely on the stop element. In a further embodiment, the axial end of the cable outer conductor can additionally also be clamped between an end face radially adjoining the foremost turn of the internal thread in the axial end region of the compression sleeve and an opposite stop face of the stop element.

Due to the clamping, the axial end of the cable outer conductor is preferably wrinkled in the pressing zone. The number of folds of the cable outer conductor is dependent on the one hand on how far the cable protrudes with the outer conductor beyond the axial end of the foremost thread turn of the compression sleeve. On the other hand, the number of folds that form is dependent on the pitch angle of the thread and on the flexibility of the outer conductor tube or the outer conductor material.

The compression sleeve and the stop element are preferably connected via at least one fastening means belonging in each case to the plug connector. The outer conductor contact element and a fastening sleeve each preferably serve as fastening means which are connected to one another.

The stop element is inserted in the metal outer conductor contact element, which forms the main component of the outer conductor contacting of the coaxial plug connector and is distanced from the inner conductor contact element of the plug connector by means of an insulator element, and is typically electrically and mechanically connected to the stop element by means of a press fit. In a specific embodiment, the stop element and the outer conductor sleeve can also be formed in one part.

In the preassembled state of the plug connector, the compression sleeve is arranged axially movably relative to the stop element and captively in the plug connector. To this end, the axial movement of the compression sleeve is limited by the stop element and the fastening sleeve, in each case in an axial direction.

In the assembled state of the plug connector and the cable, the fastening sleeve is connected to the outer conductor contact element preferably in an interlocking or frictionally engaged fashion (screw connection or press-fit connection). The fastening sleeve surrounds at least the compression sleeve and, in the assembled state of the plug connector and of the cable, pushes the compression sleeve axially against the stop element. In the non-assembled state of the plug connector and the cable, the fastening sleeve, similarly to the compression sleeve, is arranged in the plug connector so as to be axially movable along the longitudinal axis of the plug connector. The compression sleeve is pressed in the direction of the stop element for example via a shoulder of the fastening sleeve formed on an inner wall or via a rib of the fastening sleeve formed on an inner wall, which shoulder or rib for example pushes against a flange of the compression sleeve formed on the outer wall of the compression sleeve or against an axial end face of the compression sleeve directed in the cable direction. The fastening sleeve can be produced from a metal or non-metal material.

Advantageous embodiments and refinements will become clear from the description given with reference to the figures of the drawing.

It shall be understood that the features described above and the following features yet to be explained can be used not only in the specified combinations, but also in other combinations or in isolation, without departing from the scope of the present invention.

In a preferred embodiment of the invention, an end face with a tapering diameter is formed in the axial end region of the stop element. The tapering end face of the stop element forms the preferred stop face of the stop element, against which the axial end of the cable outer conductor is pressed. The tapering end face is preferably conical, but can also be concave or convex. The end face of the stop element tapering in respect of the diameter is preferably formed only in the innermost region of the end face of the stop element and therefore has a steep flank. The highest elevation of the end face of the stop element tapering in respect of the diameter is circular and tapers sharply. It is preferably formed at a radial distance from the longitudinal axis of the electrical plug connector in such a way that, during the process of assembling the plug connector, the sharply tapered axial end of the end face of the stop element tapering in respect of the diameter penetrates the transition region between the insulator and the outer conductor of the cable. The axial end of the cable outer conductor is in this way reliably deflected along the flank of the end face of the stop element tapering in respect of the diameter. The axial end of the cable is thus deflected from its originally only axial orientation into an orientation with an axial and a radial component and thus allows end-face and radial contact with the outer conductor of the plug connector.

The axial end of the cable outer conductor is preferably clamped only between the support face of the support element tapering in respect of the diameter and the tooth flank face of the foremost turn of the internal thread formed on the compression sleeve. Due to be tapering diameter of the support face of the support element, the support face additionally has a component in the longitudinal axis direction of the electrical plug connection. In the assembled state, the entire foremost turn of the internal thread formed on the compression sleeve is therefore able to be pressed against the stop face of the stop element. The axial end of the cable outer conductor is in this case clamped with an approximately constant contact pressure over the entire angular circumference of 360° between the foremost turn of the internal thread of the compression sleeve and the stop face of the stop element. In this case, the occurrence of passive intermodulations and impedance discontinuities is eliminated to the greatest possible extent.

Besides the formation of the diameter tapering of the end face of the stop element only in the innermost region of the end face, a tapering of the diameter of the end face over the entire radial extent of the axial end of the stop element is also possible.

In order to realize the clamping of the cable outer conductor between the stop element and the compression sleeve with approximately constant contact pressure over the entire angular circumference of 360°, the tilt angle and the orientation angle are adapted to the pitch angle of the thread in the compression sleeve and in the cable outer conductor respectively. In the best-possible case, they each correspond to the pitch angle of the thread.

Since the axial end of the compression sleeve is not necessarily determined by the tooth flank of the foremost thread turn, but by the plug-side end face of the compression sleeve, which adjoins the thread radially outwardly, the plug-side end face of the compression sleeve can be supported on the opposite stop face of the stop element. In this case, it may be that the foremost thread turn of the compression sleeve is not pressed against the support face tapering in respect of the diameter. In order to avoid this, in a further preferred embodiment of the invention, the plug-side end face of the compression sleeve has an inclined plane corresponding to the pitch angle of the thread. The normal vector of the plug-side end face of the compression sleeve is rotated relative to the longitudinal axis of the compression sleeve by an orientation angle which preferably corresponds to the pitch angle of the thread in the compression sleeve.

Instead of an inclined plug-side end face of the compression sleeve, a region, preferably a ridge-like region, in the assembled state can be axially compressed at the plug-side end of the compression sleeve. With sufficient compression force, the ridge-like region of the compression sleeve is preferably "levelled" so that the "levelled" plug-side end face of the compression sleeve has an inclined plane. The normal vector of the "levelled" plug-side end face of the compression sleeve has an orientation angle relative to the longitudinal axis of the compression sleeve preferably corresponding to the pitch angle of the thread in the compression sleeve.

In a first embodiment of the invention, the longitudinal axis of the compression sleeve is tilted, at least in the axial end region of the compression sleeve, relative to a longitudinal axis of the electrical plug connector. Since the compression sleeve represents the movable component of the two essential components of the connection on the side of the outer conductor, the tilt movement can be performed in the simplest possible way and thus preferably at the compression sleeve. The stop element in the first embodiment is fixed and has a longitudinal axis corresponding to the longitudinal axis of the electrical plug connector. With the tilting of the compression sleeve, at least of the axial end region of the compression sleeve, by a tilt angle corresponding to the pitch angle of the thread in the compression sleeve, at least half of the foremost thread turn of the compression sleeve has an orientation parallel to the stop face of the stop element.

In a first variant of the first embodiment of the invention, only an axial end region of the compression sleeve is tilted relative to the rest of the axial region of the compression scheme. To this end, a slot-shaped recesses is formed in the compression sleeve. The slot-shaped recess is formed in an axial region of the compression sleeve which separates the axial end region comprising at least the foremost thread turn from the rest of the axial region of the compression sleeve.

The slot-shaped recess extends preferably in the circumferential direction of the compression sleeve. It is formed in an angular region of the sleeve-like compression sleeve in which the individual thread turn, in the non-assembled state, is positioned axially closer to the stop element than the same thread turn in the rest of the angular region of the compression sleeve. In addition, the slot-shaped recess extends in its longitudinal extent preferably over a certain angular segment in the sleeve-like compression sleeve, which is reduced compared to the total angular circumference of 360°. If both conditions are present, the slot-shaped recess is thus compressible in its transverse extent between the compression sleeve and the compensation element during the assembly process. The slot-shaped recess is compressed in its transverse extent in such a way that the slot-shaped recess is closed at least in part, preferably fully, after the compression.

The compression of the slot-shaped recess in its transverse extent is accompanied by a tilting movement of the axial end region of the compression sleeve relative to the rest of the axial region of the compression sleeve. At least half of the foremost thread turn in the compression sleeve, following the tilting in its longitudinal extent, is oriented normal to the longitudinal axis of the electrical plug connector. An optimized clamping of the cable outer conductor between the compression sleeve and the stop element and a constant contact pressure between the cable outer conductor and the plug connector outer conductor is thus produced.

The size of the angular segment over which the longitudinal extent of the slot-shaped recess extends is preferably greater than 220° and less than 300°, in particular preferably greater than 240° and less than 270°.

The slot-shaped recess preferably extends along a thread path, preferably in a thread valley of the thread path, in order to promote the tilting movement of the axial end region of the compression sleeve. However, it is also conceivable that the slot-shaped recess be formed in a plane of the compression sleeve oriented normal to the longitudinal axis of the compression sleeve.

The slot-shaped recess can be realized as a through-hole in the compression sleeve. This is the most movable variant for a tilting movement. In addition, the slot-shaped recess can also be formed as a blind bore starting from the outer lateral surface of the compression sleeve. The depth of the slot-shaped blind bore is dimensioned such that a thin wall thickness is present from the base of the blind bore to the inner lateral surface of the compression sleeve, which allows an axial compression of the blind bore and therefore a tilting movement of the axial end of the compression sleeve by the assembly process.

In addition to the formation of a single slot-shaped recess, a plurality of slot-shaped recesses running axially in parallel are also possible, which each extend over an angular segment of different length in order to promote, in addition, a softer and more precise tilting movement.

A dielectric material with a high mechanical strength and a high elongation at break, for example polyamide, is preferably used for the compression sleeve, in order to, on the one hand, be able to transfer a sufficient pressing force from the compression sleeve to the stop element, and, on the other hand, prevent the axial end region of the compression sleeve from breaking off, by means of the formation of the slot-shaped recess.

In a further variant of the first embodiment of the invention, the entire compression sleeve is tilted relative to the stop element. The longitudinal axis of the entire compression sleeve is thus tilted relative to the longitudinal axis of the stop element or the longitudinal axis of the electrical plug connector. Here, the compression sleeve is tilted by a tilt angle corresponding preferably to the pitch angle of the thread.

In order to tilt the compression sleeve as precisely as possible by this tilt angle, the cable-side end face of the compression sleeve has, for example, an incline corresponding to the pitch angle of the thread in the compression sleeve. The normal vector of the cable-side axial end face of the compression sleeve is therefore rotated by an orientation angle relative to the longitudinal axis of the compression sleeve, which orientation angle corresponds to the pitch angle of the thread in the compression sleeve.

The fastening sleeve, which during the assembly process pushes against the cable-side end face of the compression sleeve and presses the compression sleeve against the stop element, during the assembly process causes the compression sleeve to tilt, preferably by the pitch angle.

Alternatively, a flange-like or rib-like region, which is formed on the outer lateral surface of the compression sleeve and against which the fastening sleeve pushes, can also have an incline formed in this way. It is also conceivable that the interior of the fastening sleeve and additionally the outer conductor contact element, in which the compression sleeve is held in the assembled state, each have a moulding, which allows an exact tilting of the compression sleeve by the pitch angle. To this end, for example, the interior of the fastening sleeve and of the outer conductor contact element is correspondingly inclined in each case and therefore no longer has to be formed coaxially with the longitudinal axis of the electrical plug connector.

In a second embodiment of the invention, the longitudinal axis of the stop element is tilted, at least in an axial end region of the stop element, relative to a longitudinal axis of the electrical plug connector. The longitudinal axis of the compression sleeve corresponds to the longitudinal axis of the electrical plug connector. The compression sleeve can thus be pressed against the stop element by the fastening sleeve by means of a simple movement in translation, i.e. by means of an axial movement, along the longitudinal axis of the electrical plug connector.

By means of a tilting movement of the stop element by a tilt angle, preferably equal to the pitch angle of the thread, the stop face of the stop element can be aligned with the inclined orientation over at least half of the longitudinal extent of the foremost thread turn in the compression sleeve.

In a first variant of the second embodiment of the invention, similarly to the first variant of the first embodiment, a slot-shaped recess is formed in the hollow-cylindrical stop element and, following the assembly of the plug connector and the cable, is compressed at least partly, preferably fully, in its transverse extent. In this way, the longitudinal axis of the axial end region of the stop element is tilted relative to the longitudinal axis of the electrical plug connector or relative to the longitudinal axis of the compression sleeve.

The features already explained above in relation to the slot-shaped design in the compression sleeve apply equivalently for the forming of the slot-shaped recess in the stop element:

The slot-shaped recess can be formed both as a through-bore and as a blind bore. Besides the forming of a single slot-shaped recess, a plurality of slot-shaped recesses running axially in parallel which each extend over an angular segment of different length, are also possible.

A metal material with a high mechanical strength, a high elongation at break and a high electrical conductivity, for example brass or bronze, is preferably used for the stop element.

The slot-shaped recess is preferably formed in an angular region of the sleeve-shaped stop element to which the individual thread turn formed in the opposite compression sleeve is positioned axially closest. In addition, the slot-shaped recess, in its longitudinal extent, preferably extends over a specific angular segment into the sleeve-shaped stop element, which is reduced in comparison to the total angular circumference of 360°. The size of the angular segment over which the slot-shaped recess extends is preferably greater than 220° and smaller than 300°, in particular preferably greater than 240° and smaller than 270°.

The compression of the slot-shaped recess in its transverse extent results in a tilting movement of the axial end region of the stop element relative to the rest of the axial region of the stop element. The longitudinal axis of the axial end region of the stop element, after the tilting, is oriented orthogonally to at least half of the longitudinal extent of the foremost thread turn in the compression sleeve. An approximately optimized clamping of the cable outer conductor between the compression sleeve and the compensation element and an approximately constant contact pressure between the cable outer conductor and the plug connector outer conductor are thus provided.

In a second variant of the second embodiment of the invention, the entire stop element is tilted by a tilt angle preferably corresponding to the pitch angle of the thread. To this end, the interior of the hollow-cylindrical outer conductor contact element, in which the stop element is inserted, is preferably shaped in such a way that, when assembling the plug connector and the cable, the compression sleeve can cause the stop element to be tilted, and the stop element, at the end of the assembly process, can be disposed in the correct tilt orientation within the external conductor contact element.

To this end, a stop face, for example a shoulder or a rib, on which the stop element can be supported in the assembled state, is formed on the inner wall of the outer conductor contact element. The normal vector of the stop face has an incline relative to the longitudinal axis of the stop element, i.e. the normal vector of the stop face is rotated relative to the longitudinal axis of the stop element by an orientation angle preferably corresponding to the pitch angle of the thread.

Alternatively, the plug-side end face of the stop element can have an incline relative to the longitudinal axis of the stop element, i.e. the normal vector of the plug-side end face of the stop element is rotated relative to the longitudinal axis of the stop element by an orientation angle corresponding to the pitch angle of the thread of the compression sleeve.

In both cases, the stop element, which is tilted by the compression sleeve in the assembly process, in the assembled state is tilted relative to the longitudinal axis of the plug connector by a tilt angle which preferably corresponds to the pitch angle of the thread of the compression sleeve.

In a third embodiment of the invention, a normal vector of a plane which is spanned by an edge between an end face and an inner lateral surface of the stop element is tilted relative to a longitudinal axis of the electrical plug connector preferably by the pitch angle of the thread of the compression sleeve. The longitudinal axes of the stop element, the compression sleeve and the electrical plug connector are in this case identical.

By means of such an orientation of the cable-side end region of the stop element by a tilt angle equal to the pitch angle of the thread, the stop face of the stop element can be aligned with the inclined orientation over at least half the longitudinal extent of the foremost thread turn in the compression sleeve.

If the cable side end region of the stop element, additionally to its inclined orientation, also has a tapering diameter, the axial end of the cable outer conductor is preferably pressed between the flank of the tapering end face of the stop element and the foremost thread turn of the compression sleeve over the entire angular circumference of 360°. An approximately constant contact pressure between the cable outer conductor and the plug connector outer conductor is thus provided.

In a fourth embodiment of the invention, the edge between the end face and the inner lateral surface of the stop element in a longitudinal axis direction of the plug connector has a helical course. The helical course of the edge preferably corresponds to the helical course of the thread turn in the inner lateral surface of the compression sleeve. In addition to the helical course of the edge, the cable-side end region of the stop element can have an end face with a tapering diameter.

The axial end of the cable outer conductor is thus preferably clamped between the flank of the tapering end face of the stop element and the foremost thread turn of the compression sleeve with a constant contact pressure over the entire angular circumference of 360°.

The invention additionally covers an electrical plug connector assembly comprising an electrical plug connector and a cable, the outer conductor of which is screwed into the compression sleeve of the electrical plug connector.

Lastly, the invention also covers an electrical plug connection comprising an electrical plug connector assembly and electrical mating plug connector corresponding to the electrical plug connector.

The technical features explained previously in relation to the electrical plug connector apply similarly for the electrical plug connector assembly and for the electrical plug connection.

The above embodiments and refinements can be combined with one another arbitrarily, provided this is expedient. Further possible embodiments, refinements and implementations of the invention also comprise combinations not explicitly stated of features of the invention described previously or hereinafter in relation to the exemplary embodiments. In particular, a person skilled in the art will also add individual features as improvements or supplementations to the relevant basic form of the present invention.

SUMMARY

Our electrical plug connector, electrical plug connector assembly, and electrical plug connection generally provides a compression sleeve (14); a stop element (13) and an outer conductor (6) of a cable (3).

A principal aspect of the present invention is an electrical plug connector (2) for a cable (3), having a compression sleeve (14) and a stop element (13), wherein the stop element (13) is arranged axially adjacently to the compression sleeve (14) in an insertion direction of the electrical plug connector (2) and is connected to the compression sleeve (14), wherein the compression sleeve (14) has an inner lateral surface (19) shaped in the form of a thread, which inner lateral surface is designed to be screwable to an outer lateral surface (20), shaped in the form of a thread, of an outer conductor (6) of the cable (3), wherein the connection between the compression sleeve (14) and stop element (13) is designed in such a way that an axial end (15) of the outer conductor (8) is clampable between an axial end region (41) of the compression sleeve (14) adjacent to the stop element (13) and an axial end region (45) of the stop element (13) adjacent to the compression sleeve (14), and that a) in an assembled state of the plug connector (2) and of the cable (3), a longitudinal axis of the compression sleeve (14), at least in the axial end region (41) of the compression sleeve (14), is tilted by a tilt angle ($\varphi_K$) relative to a longitudinal axis of the stop element (13) at least in the axial end region (45) of the stop element (13) or b) a normal vector of a plane (46) which is spanned by an edge (47) between an end face (16) and an inner lateral surface (48) of the stop element (13) is rotated by an orientation angle ($\varphi_A$) relative to the longitudinal axis of the compression sleeve (14) or c) the edge (47) has a helical course in a longitudinal axis direction of the plug connector (2).

A further aspect of the present invention is an electrical plug connector (2) characterized in that in the axial end region (44) of the stop element (13), the end face (16) is formed with a tapering diameter.

A further aspect of the present invention is an electrical plug connector (2) characterized in that the tilt angle ($\varphi_K$) and the orientation angle ($\varphi_A$) each lie in an angular range of +/−20% of a pitch angle of a thread path of the inner lateral surface (19) shaped in the form of a thread, preferably in an angular range of +/−10% of the pitch angle, in particular preferably in an angular range of +/−5% of the pitch angle, and at best correspond to the pitch angle.

A further aspect of the present invention is an electrical plug connector (2) characterized in that a normal vector of a plug-side end face (42) of the compression sleeve (14) to the longitudinal axis of the compression sleeve (14) is rotated by the orientation angle ($\varphi_A$).

A further aspect of the present invention is an electrical plug connector (2) characterized in that a region, preferably a ridge-like region (43), of the axial end region (41) of the compression sleeve (14) in an assembled state of the plug connector (2) and of the cable (3) is axially compressed.

A further aspect of the present invention is an electrical plug connector (2) characterized in that the longitudinal axis of the compression sleeve (14), at least in the axial end region (41) of the compression sleeve (14), is tilted relative to a longitudinal axis of the electrical plug connector (2).

A further aspect of the present invention is an electrical plug connector (2) characterized in that a slot-shaped recess (40) is formed in the compression sleeve (14).

A further aspect of the present invention is an electrical plug connector (2) characterized in that a longitudinal extent of the slot-shaped recess (40) is formed along the thread path, preferably along a thread valley of the thread path, or normal to the longitudinal axis of the compression sleeve (14).

A further aspect of the present invention is an electrical plug connector (2) characterized in that the slot-shaped recess (40) of the compression sleeve (14) is formed as a through-bore or as a blind bore.

A further aspect of the present invention is an electrical plug connector (2) characterized in that the longitudinal axis of the entire compression sleeve (14) is tilted relative to the longitudinal axis of the electrical plug connector (2).

A further aspect of the present invention is an electrical plug connector (2) characterized in that the longitudinal axis of the stop element (13), at least in the axial end region (45) of the stop element (13), is tilted relative to a longitudinal axis of the electrical plug connector (2).

A further aspect of the present invention is an electrical plug connector (2) characterized in that a slot-shaped recess (44) is formed in the stop element (13).

A further aspect of the present invention is an electrical plug connector (2) characterized in that the longitudinal axis of the entire stop element (13) is tilted relative to the longitudinal axis of the electrical plug connector (2).

A still further aspect of the present invention is an electrical plug connector assembly comprising an electrical plug connector (2) and the cable (3), the outer conductor (3) of which is screwed into the compression sleeve (14) of the electrical plug connector (2).

An even still further aspect of the present invention is an electrical plug connection (33) comprising an electrical plug connector assembly (1) according to Claim 14 and an associated electrical mating plug connector (32).

These and other aspects of the present invention are more fully set forth herein.

BRIEF DESCRIPTIONS OF THE FIGURES

In the Figures, functionally identical elements are provided with the same reference signs.

The present invention will be explained in greater detail hereinafter with reference to the exemplary embodiments described in the schematic figures of the drawing. The figures show:

FIGS. 3A, 3B, 3C, and 3D show a sequence of cross-sectional illustrations of a further modification of a compression sleeve of a first variant of a first embodiment of the plug connector according to the invention in the assembly process.

Figure 4A:
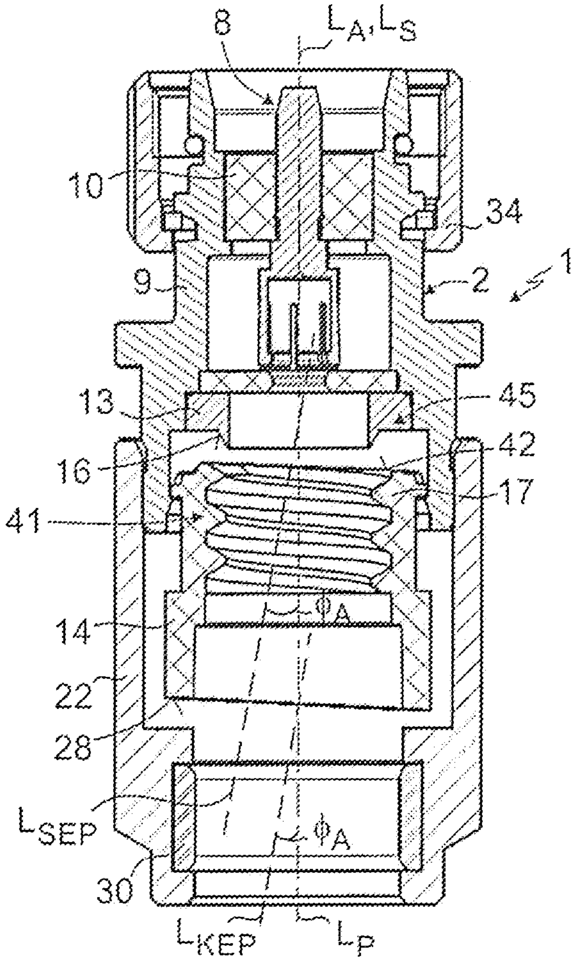

FIG. 4A is a cross-sectional illustration of a second variant of a first embodiment of the plug connector according to the invention in the non-assembled state and in the assembled state.

Figure 4B:
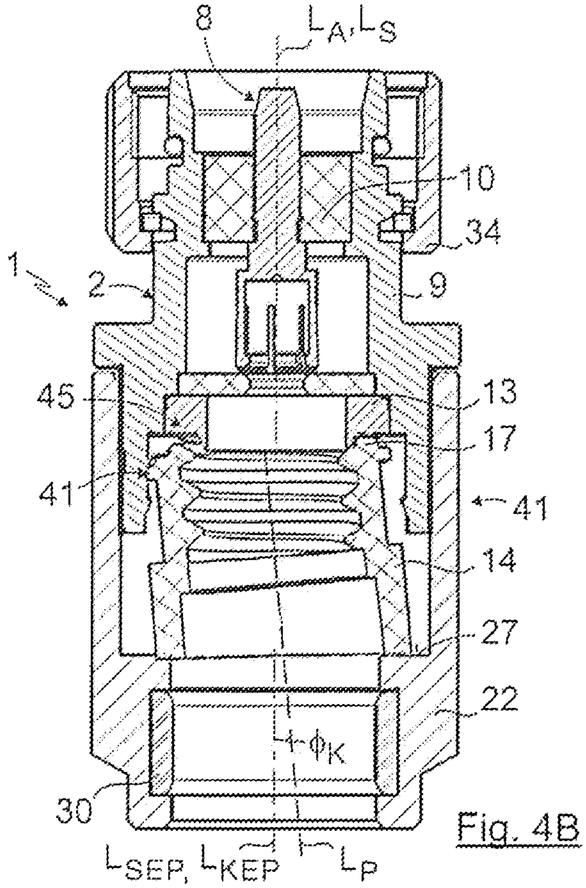

FIG. 4B is a cross-sectional illustration of a second variant of a first embodiment of the plug connector according to the invention in the non-assembled state and in the assembled state.

Figure 5A:
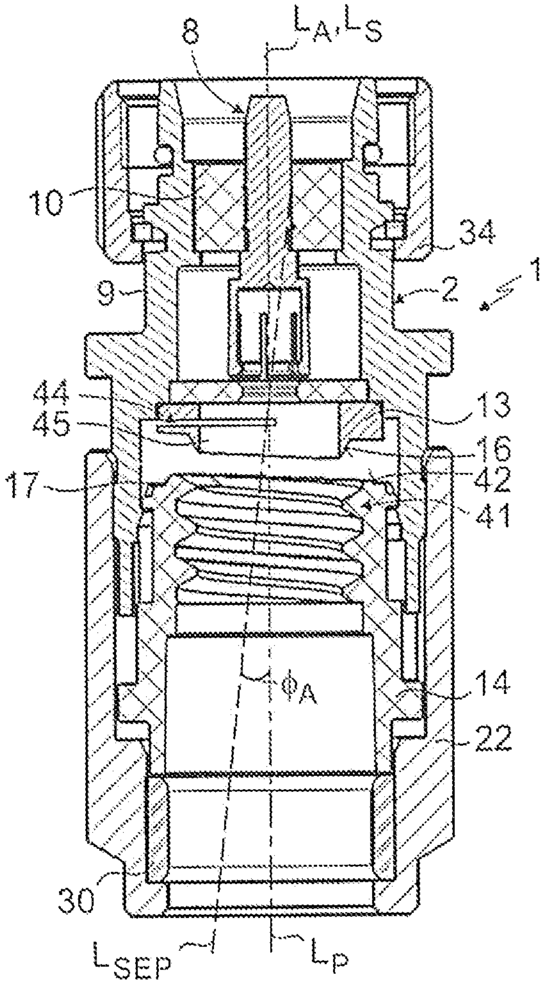

FIG. 5A is a cross-sectional illustration of a first variant of a second embodiment of the plug connector according to the invention in the non-assembled state and in the assembled state.

Figure 5B:
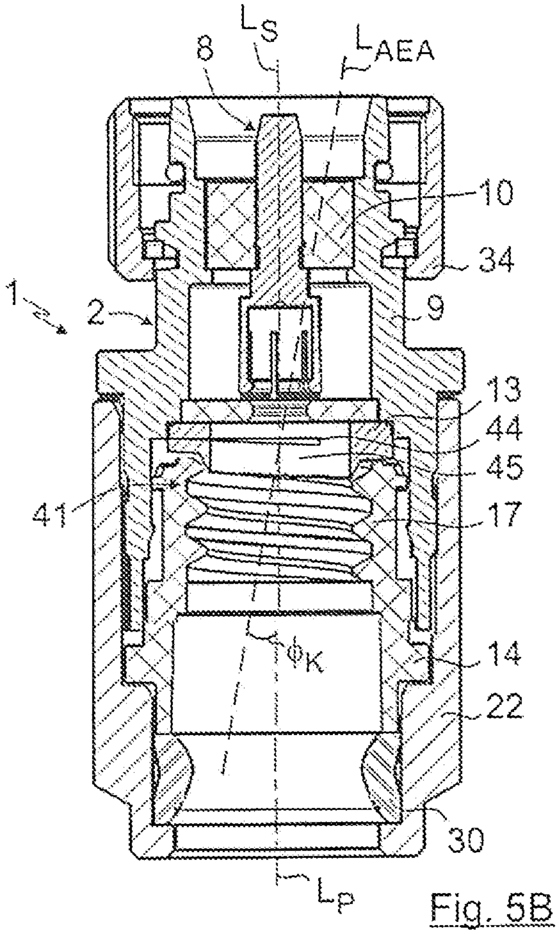

FIG. 5B is a cross-sectional illustration of a first variant of a second embodiment of the plug connector according to the invention in the non-assembled state and in the assembled state.

Figure 6A:
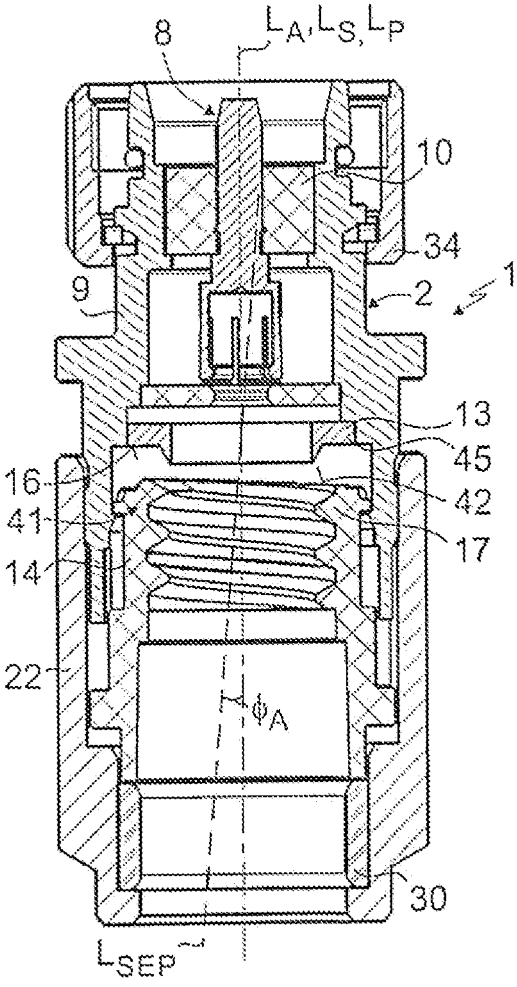

FIG. 6A is a cross-sectional illustration of a second variant of a second embodiment of the plug connector according to the invention in the non-assembled state and in the assembled state.

Figure 6B:
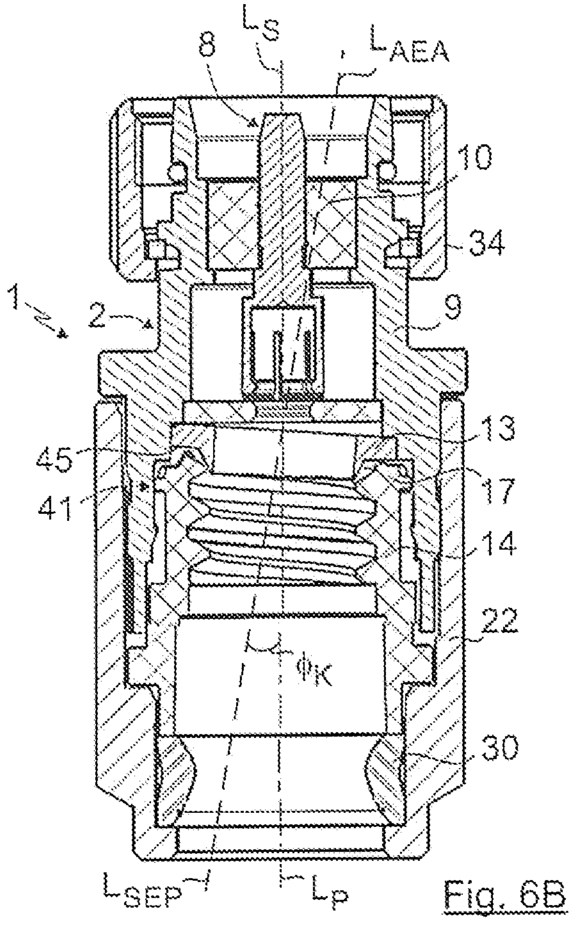

FIG. 6B is a cross-sectional illustration of a second variant of a second embodiment of the plug connector according to the invention in the non-assembled state and in the assembled state.

Figure 7A:
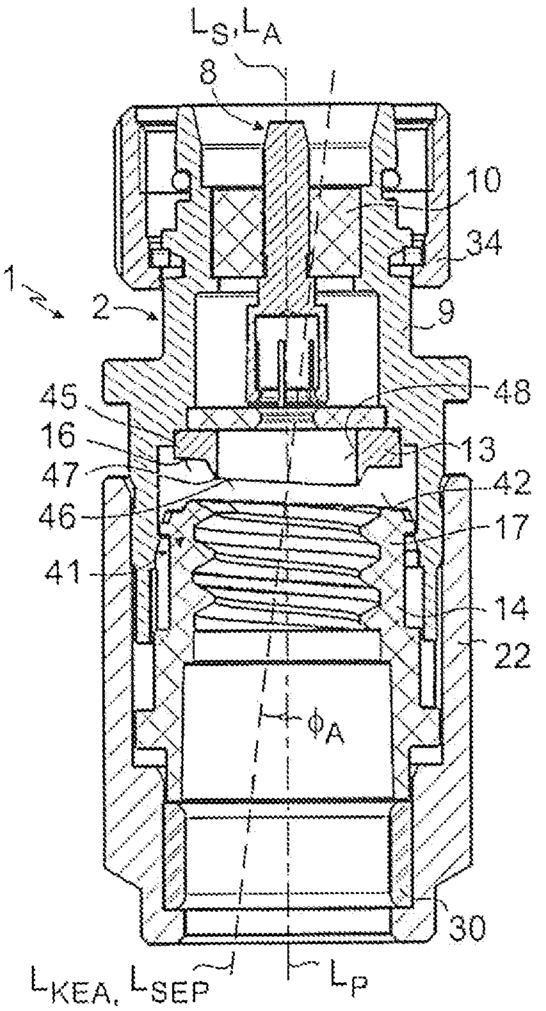

FIG. 7A is a cross-sectional illustration of a third embodiment of the plug connector according to the invention in the non-assembled state and in the assembled state.

Figure 7B:
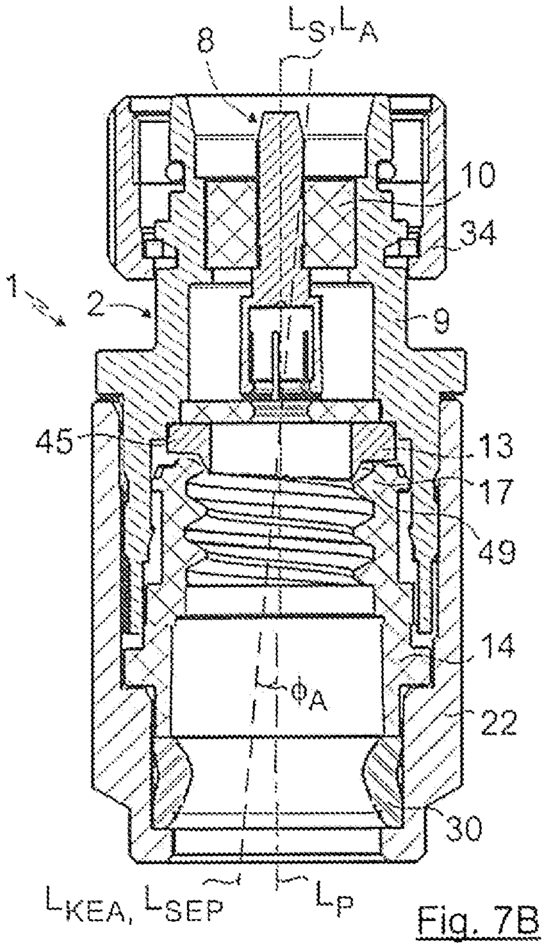

FIG. 7B is a cross-sectional illustration of a third embodiment of the plug connector according to the invention in the non-assembled state and in the assembled state.

Figure 8A:
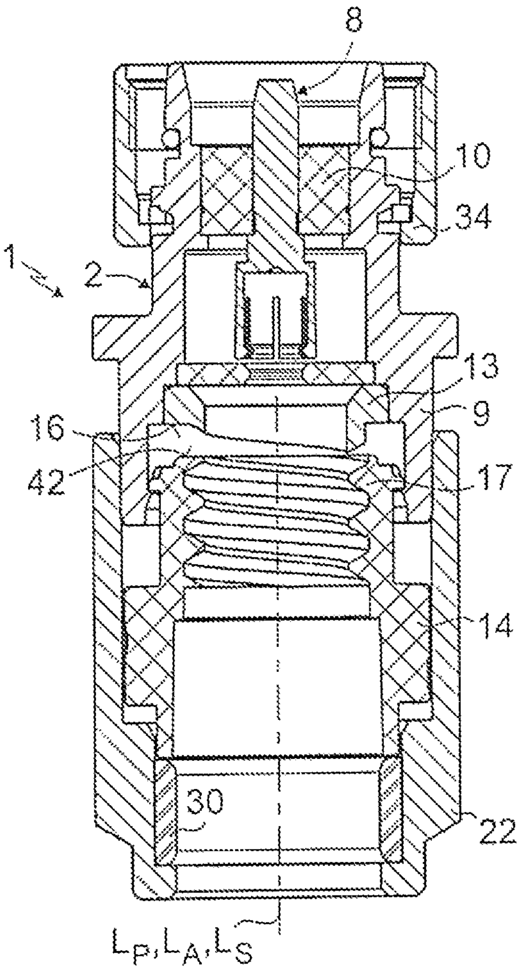

FIG. 8A is a cross-sectional illustration of a fourth embodiment of the plug connector according to the invention in the non-assembled state and in the assembled state.

Figure 8B:
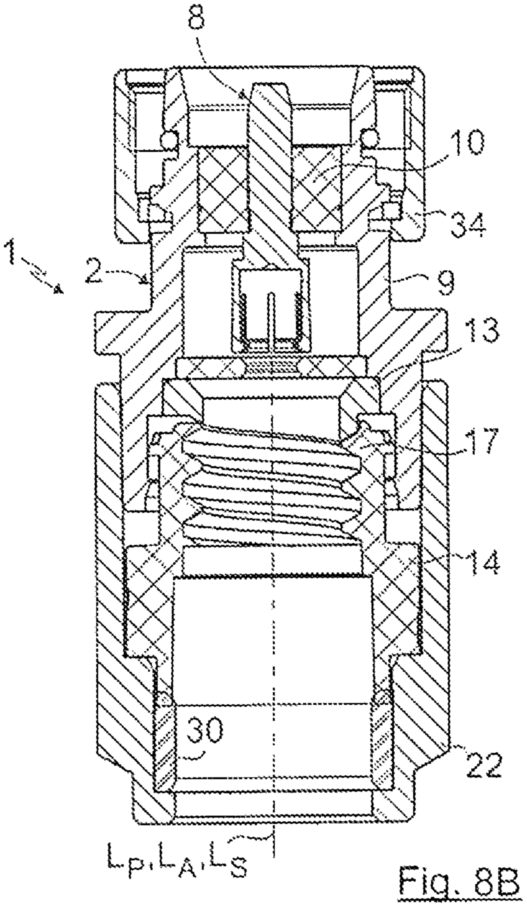

FIG. 8B is a cross-sectional illustration of a fourth embodiment of the plug connector according to the invention in the non-assembled state and in the assembled state.

Figure 8C:
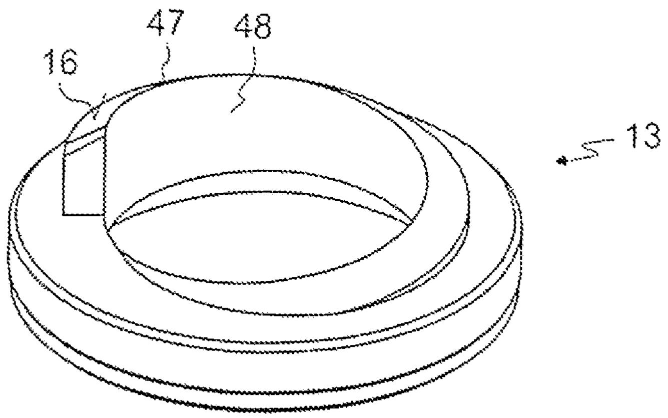

FIG. 8C is a perspective illustration of a stop element of the fourth embodiment of the plug connector according to the invention.

The accompanying figures of the drawing are intended to provide a further understanding of the embodiments of the invention. They illustrate embodiments and serve in conjunction with the description to explain principles and concepts of the invention. Other embodiments and many of the described advantages shall become clear in view of the drawings. The elements in the drawings are not necessarily shown true to scale in relation to one another.

In the figures of the drawing, like, functionally like and similarly acting elements, features and components—unless stated otherwise—are provided in each case with the same reference sign.

DETAILED WRITTEN DESCRIPTION OF THE PREFERRED EMBODIMENTS

This disclosure of the invention is submitted in furtherance of the Constitutional purposes of the US Patent Laws "to promote the progress of Science and the useful arts" (Article 1, Section 8).

Figure 1A:
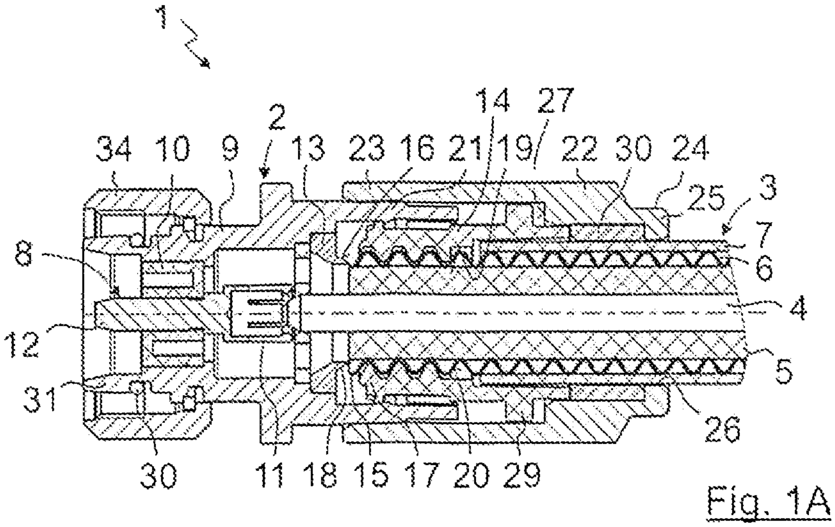
FIG. 1A is a cross-sectional illustration of an electrical plug connector assembly according to the invention in a preassembled state.
Figure 1B:
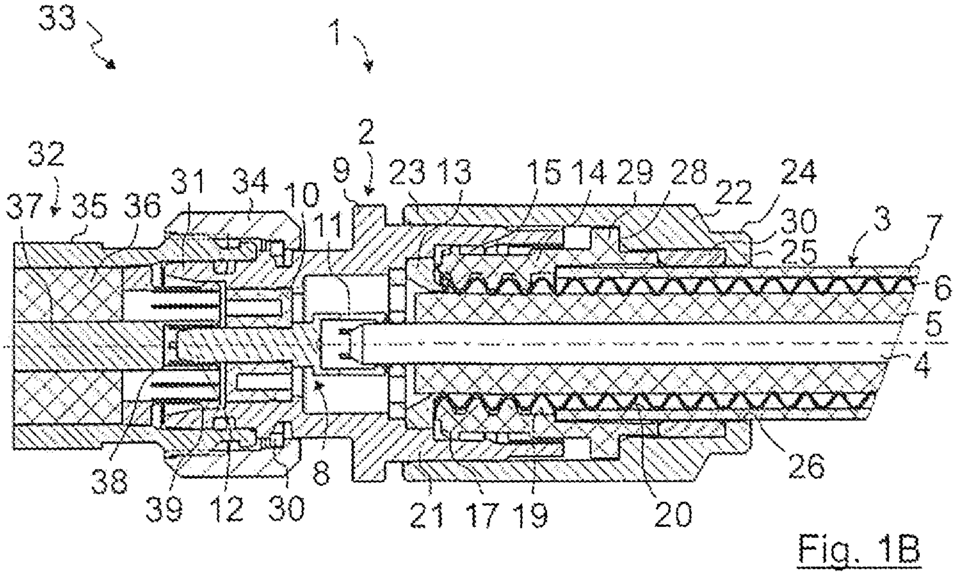
FIG. 1B is a cross-sectional illustration of the electrical plug connection according to the invention.

Before the individual variants and embodiments of an electrical plug connector according to the invention are explained in detail, the electrical plug connector assembly according to the invention in a preassembled state will be explained with reference to FIG. 1A, and the electrical plug connection formed of the assembled electrical plug connector and the associated electrical mating plug connector will be explained with reference to FIG. 1B:

The electrical plug connector assembly 1, in the assembled state, comprises an electrical plug connector 2 and a cable 3 connected to the electrical plug connector 2 (see FIG. 1B). The electrical plug connector assembly 1, the electrical plug connector 2 and the cable 3 are each formed coaxially for transmission of a high-frequency signal.

The cable 3 has an inner conductor 4, a dielectric 5 surrounding the inner conductor 4 concentrically, an outer conductor 6 surrounding the dielectric concentrically, and a cable sheath 7 surrounding the outer conductor 6 concentrically. The outer conductor 6 is formed as a corrugated metal tube. The region between the corrugated metal tube of the outer conductor 6 and the dielectric 5 is preferably filled with air, in order to allow a "corrugated cable" of this kind to bend slightly. The inner conductor 4 can also be formed as a corrugated metal tube or as a non-corrugated metal tube.

The electrical plug connector 2 comprises an inner conductor contact element 8, an outer conductor contact element 9 and an insulator element 10, which is arranged between the inner conductor contact element 8 and the outer conductor contact element 9. The insulator element 10 spaces the inner conductor contact element 8 coaxially from the outer conductor contact element 9 and insulates them electrically from one another.

The inner conductor contact element 8 has, on the cable side, a socket-like end 11 formed as a spring contact sleeve for receiving the inner conductor 4 of the cable 3 and for frictionally engaged connection thereto. On the plug side, the inner conductor contact element 8 preferably has a pin-like end 12 for contacting or for connection to the socket-like mating contact element of the electrical mating plug connector (see FIG. 1B). Alternatively, however, the plug-side end of the inner conductor contact element 8 can also be designed in the form of a socket.

The outer conductor contact element 9 is designed in the form of a sleeve. An annularly shaped metal stop element 13 is arranged on a shoulder formed on the inner lateral surface of the outer conductor contact element 9 in the direction of the cable 3. The stop element 13 is preferably connected to the outer conductor contact element 9 by means of a press fit. However, other fastening techniques are also conceivable, for example a screw connection or a solder connection. The stop element 13 can alternatively also be connected in one part to the outer conductor contact element 9. A compression sleeve 14 is arranged axially adjacently to the stop element 13 in the direction of the cable 3.

In the non-assembled state of the plug connector assembly 1, in which the cable 3 is not yet connected to the plug connector 2, the compression sleeve 14 is arranged so as to be movable axially within the plug connector 1. In the assembled state of the plug connector assembly 1, a press-fit connection is formed between the stop element 13 and the compression sleeve 14, for which the axial end 15 of the outer conductor 6 of the cable 3 exposed from the cable sheath 7 is clamped between an end face of the stop element 13 formed as a stop face 16 and the plug-side end region 17 of the compression sleeve 14. In order to deflect the axial end 15 of the outer conductor 6 of the cable 3 from its originally axial orientation during the compression into an axial and simultaneously a radial orientation, the stop element 13 has a tapering outer diameter in the direction of the cable 3. The tapering of the outer diameter of the stop element 13 is preferably foamed only in a region of the inner lateral surface of the sleeve-like stop element 13 in which the stop element 13 is extended in the direction of the cable 3 by an axial extension 18 by means of a conical outer lateral surface. The axial extension 18 with the conical outer lateral surface is preferably positioned radially on the stop element 13 in such a way that, during the assembly process, the tip of the conical extension 18 of the stop element 13 pierces precisely into the cable 3 between the dielectric 5 and the outer conductor 6 and deflects the axial end 15 of the outer conductor 6 axially and radially outwardly.

The inner lateral surface 19 of the compression sleeve 14 is shaped in the form of a thread which corresponds to the outer lateral surface 20, also shaped in the form of a thread, of the outer conductor 6 of the cable 3 and consequently has the same thread pitch and the same tooth flank form and size. In the assembly process, the corrugated cable is screwed by means of the outer conductor 6 exposed from the cable sheath 7 into the compression sleeve 14. At the end of the screwing process, a longitudinal portion of the axial end 15 of the outer conductor 6 is screwed out from the foremost turn of the inner lateral surface 19, shaped in the form of a thread, of the compression sleeve 14, this being necessary for reliable clamping between the stop element 13 and the compression sleeve 14.

The compression sleeve 14, in the case of the first variant of the first embodiment of the invention, is preferably produced from a plastic material in order to achieve a sufficient elasticity for the tilting of the axial end region relative to the rest of the region of the compression sleeve 14. In all other variants and embodiments of the invention, a metal material is also usable alternatively. The compression sleeve 14 is guided in the cable-side end region 21 sleeve-like outer conductor contact element 9. In the assembled state of the plug connector assembly 1 according to FIG. 1B, a fastening sleeve 22 acts axially in the direction of the stop element 13 on the compression sleeve 14 and pushes the plug-side end region 17 of the compression sleeve 14 against the stop face 16 of the stop element 13.

The fastening sleeve 22 is fastened at the plug-side end 23 by means of a screw connection, or alternatively by means of a press-fit connection, to the outer lateral surface of the outer conductor contact element 9 and, at the cable-side end 24, has an end-face termination region 25 with a through-bore 26 for guiding through the cable 3. The assembly process between the fastening sleeve 22 and the compression sleeve 14 is performed by means of a stop face 27 of the fastening sleeve 22, which stop face 27 is formed on the inside of the end-face termination region 25 and pushes against a counter stop face 28 of the compression sleeve 14, which is formed on a flange-like, rib-like or shoulder-like region 2 or alternatively on the cable-side end face of the compression sleeve 14.

In order to seal the plug connector assembly 1 on the cable side, a seal element 30 is preferably arranged between the cable sheath 7 of the cable 3 and the end-face termination region 25 of the fastening sleeve 22. In order to seal the plug connector assembly 1 on the plug side, a further seal element 30 is preferably inserted in a groove formed at the plug-side end 31 of the outer conductor contact element 9 on the outer lateral surface.

The mechanical fastening between the electrical plug connector 2 and the associated electrical mating plug connector 32 of the electrical plug connection 33 is achieved in the known manner by means of a union nut 34, which is fastened movably on the plug connector 2. The internal thread formed on the inner lateral surface of the union nut 34 can be screwed to a corresponding external thread which is formed on the outer lateral surface of the outer conductor contact element 35 of the mating plug connector 32. The outer conductor contact element 35 of the mating plug connector 32 surrounds a dielectric 36 of the mating plug connector 32. The dielectric 36 of the mating plug connector 32 surrounds the inner conductor 37 of the mating plug connector 32. A spring contact sleeve 38, into which the inner conductor contact element 8 of the plug connector 2 is received, is formed at the plug-side end of the inner conductor contact element 37 of the mating plug connector 32. A further spring contact sleeve 39 is inserted at the plug-side end into the outer conductor contact element 35 of the mating plug connector 32, preferably by means of a press fit, and contacts the inner lateral surface of the outer conductor contact element 9 of the plug connector 2.

In the cross-sectional illustrations of the following figures, the electrical plug connector 2 has been shown without the cable 3 for reasons of clarity.

Figure 2A:
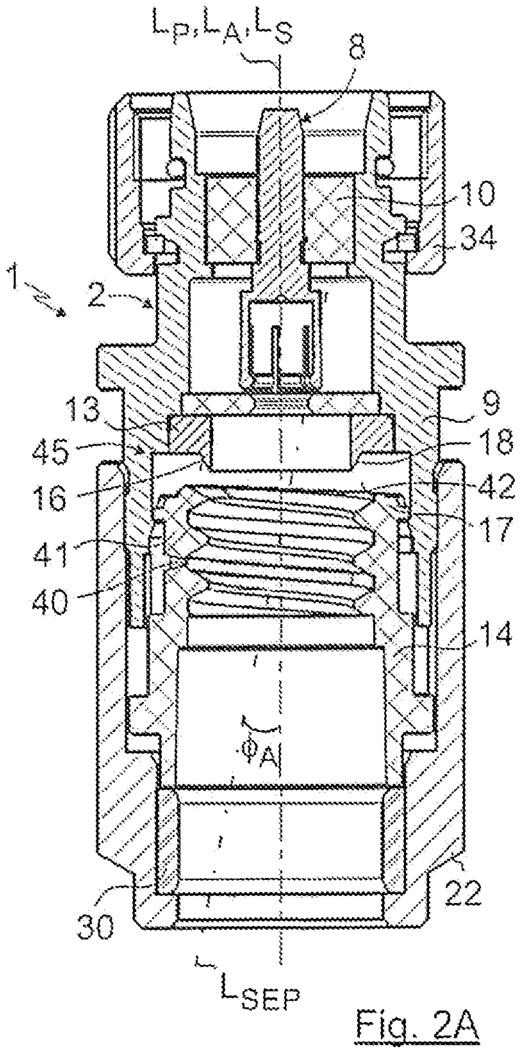
FIG. 2A is a cross-sectional illustration of a first variant of a first embodiment of the plug connector according to the invention in the non-assembled state and in the assembled state.
Figure 2B:
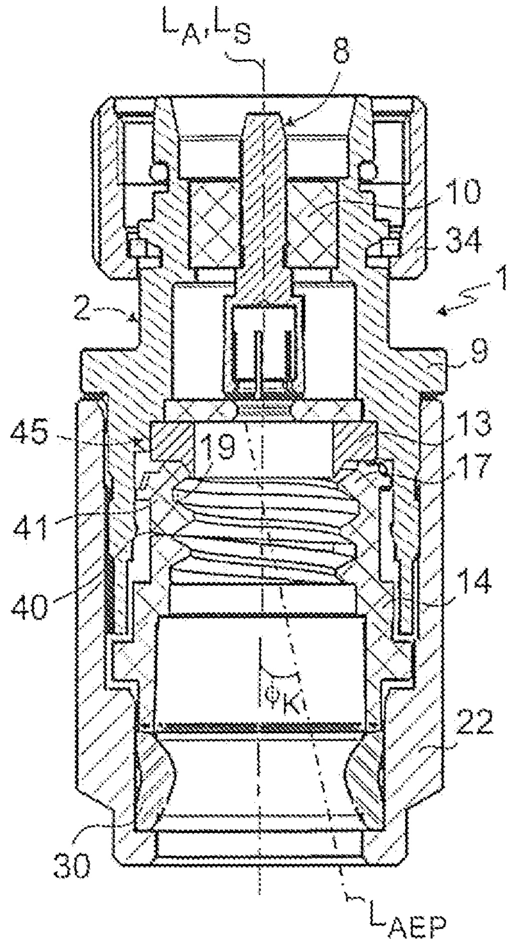
FIG. 2B is a cross-sectional illustration of a first variant of a first embodiment of the plug connector according to the invention in the non-assembled state and in the assembled state.

In a first variant of the first embodiment of a plug connector 2 according to the invention according to FIGS. 2A and 2B, the compression sleeve 14 has a slot-shaped recess 40, which is formed as a through-bore between the inner lateral surface and the outer lateral surface. This slot-shaped recess 40 preferably runs along a turn of the inner lateral surface 19, which is shaped in the form of a thread. As can be seen from the cross-sectional illustrations of FIGS. 2A and 2B, the slot-shaped recess 40 extends only over an angular segment that is reduced relative to the full angular circumference equal to 360°.

In addition, the normal vector $L_{SEP}$ of the axial end face 42 of the axial end region 41 of the compression sleeve 14, in the non-assembled state of FIG. 2A, is rotated relative to the longitudinal axis $L_P$ of the compression sleeve 14 or the longitudinal axis $L_S$ of the plug connector 2 by an orientation angle $\varphi_A$. The orientation angle $\varphi_A$ preferably corresponds to the pitch angle of the thread path of the inner lateral surface, shaped in the form of a thread, of the compression sleeve 14. The axial end face 42 of the axial end region 41 of the compression sleeve 14 is therefore formed as an inclined plane relative to an axial end face oriented in the longitudinal direction $L_S$ of the plug connector 2.

In the assembled state of the plug connector 2, in which the axial end 15 of the outer conductor 8 of the cable 3 is clamped between the stop element 13 and the compression sleeve 14, the slot-shaped recess 40 according to FIG. 2B is preferably closed. An axial end region 41 of the compression sleeve 14, which on the plug side is arranged adjacently closest to the stop element 13, is thus tilted relative to the rest of the region of the compression sleeve 14.

In the non-assembled state of the plug connector 2, the longitudinal axis $L_P$ of the compression sleeve 14, the longitudinal axis $L_A$ of the stop element 13 and the longitudinal axis $L_S$ of the plug connector 2 according to FIG. 2A lie on the same line. In the assembled state of the plug connector 2, the longitudinal axis $L_{AEP}$ of the tilted axial end region 41 of the compression sleeve 14 is tilted by a tilt angle $\varphi_K$ relative to the longitudinal axis $L_A$ of the stop element 13 corresponding to the longitudinal axis $L_S$ of the plug connector 2, in accordance with FIG. 2B. In the assembled state, the normal vector $L_{SEP}$ of the axial end face 42 of the axial end region 41 of the compression sleeve 14 is still rotated relative to the longitudinal axis $L_{AEP}$ of the tilted axial end region 41 of the compression sleeve 14 by the orientation angle $\varphi_A$.

As a result of the tilting of the axial end region 41 of the compression sleeve 14 and as a result of the incline $\varphi_A$ of the axial end face 42 relative to the longitudinal axis $L_{AEP}$ of the tilted axial end region 41 of the compression sleeve 14 in combination with the conical outer lateral surface of the axial extension 18 of the stop element 13, the plug-side end region 17 of the compression sleeve 14 is pushed over the entire angular circumference of 360° against the stop face 16 of the conically shaped axial extension 18 of the stop element 13. The axial end 15 of the outer conductor 6 of the cable 3 is thus also clamped optimally over the entire angular circumference of 360° between the compression sleeve 14 and the stop element 13, thus resulting in a constant contact pressure and therefore a constant transition resistance between the corrugated outer conductor 8 of the cable 3 and the outer conductor contact element 9 of the plug connector 2 over the entire angular circumference of 360°.

Figure 2C:
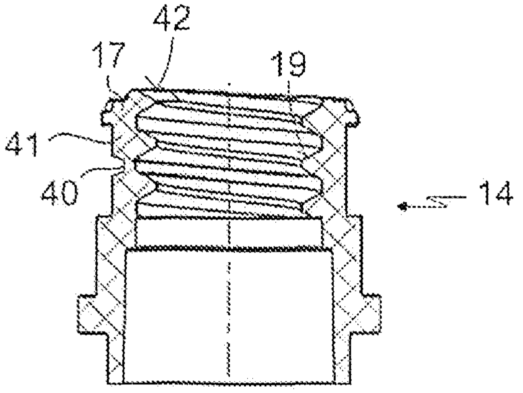
FIG. 2C is a cross-sectional illustration of a modification of a compression sleeve of a first variant of a first embodiment of the plug connector according to the invention.

Instead of a slot-shaped recess 40 formed as a through-bore according to FIGS. 2A and 2B, a compression sleeve 14 with a slot-shaped recess 40 formed as a blind bore can also be used alternatively. The blind bore, in accordance with FIG. 2C, is preferably formed on the outer lateral surface of the compression sleeve 14 in such a way that the rest of the wall of the compression sleeve 14 between the blind bore and the inner lateral surface 19, shaped in the form of a thread, of the compression sleeve 14 is deformable by the pressing force in the assembly process for tilting of the axial end region 41 by the tilt angle $\varphi_K$.

FIGS. 3A to 3D show the assembly process between the stop element 13 and the compression sleeve 14 slotted by a slot-shaped recess 40, during which process the normal vector $L_{SEP}$ of the axial end face 42 of the axial end region 41 of the compression sleeve 14 is directed along the longitudinal axis $L_A$, $L_S$, $L_P$ of the stop element 13, of the plug connector 2 and of the compression sleeve 14 respectively. By means of such a non-inclined design of an axial end face 42 of the axial end region 41 of the compression sleeve 14, a ridge-like region 43 is formed at the axial end face 42 at least over a certain angular segment, as can be seen in particular from FIG. 3A.

Figure 3A:
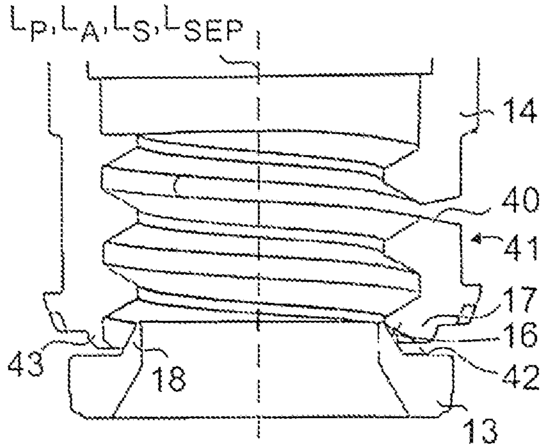

At a first point of the assembly process, which is shown in FIG. 3A, there is a first contact between the stop face 16 of the stop element 13 and the plug-side axial end region 17 of the compression sleeve 14, only in a small angular segment of the compression sleeve 14. This contacting angular segment is preferably opposite the angular segment in which the ridge-like region 43 is formed on the compression sleeve 14 (in the right-hand region of FIG. 3A). The slot-shaped recess 40 in the compression sleeve 14 is still fully open at this point of the process.

Figure 3B:
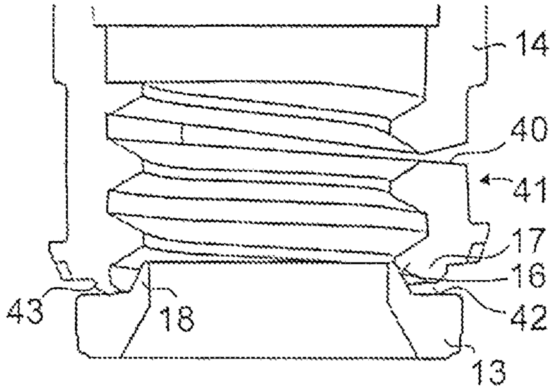

At a second point of the assembly process, which is shown in FIG. 3B, there is a first contact between the ridge-like region 43 of the compression sleeve 14 and the stop face 16 of the stop element 13. The slot-shaped recess 40 and the compression sleeve 14 is at this point of the process already pressed slightly in the axial direction and thus reduced.

Figure 3C:
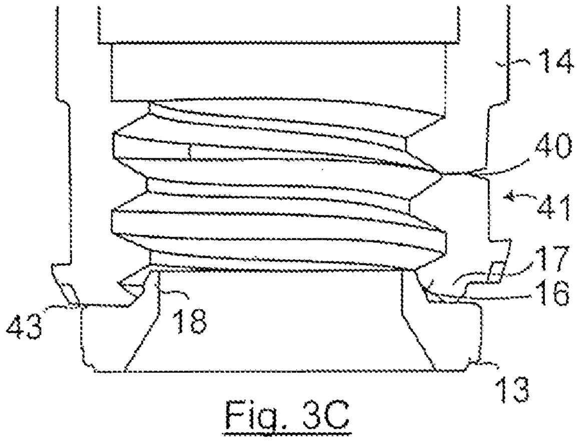

At a third point of the assembly process, which is shown in FIG. 3C, the ridge-like region 43 of the compression sleeve 14 is compressed against the opposite stop face 16 of the stop element 13. The slot-shaped recess 40 and the compression sleeve 14 is at this point of the process already closed to an advanced extent.

Figure 3D:
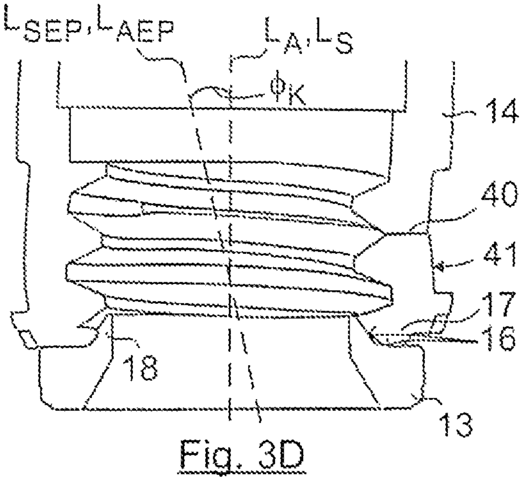

At a fourth point of the assembly process, which is shown in FIG. 3D, the compression of the ridge-like region 43 of the compression sleeve 14 at the opposite stop face 16 of the stop element 13 is complete. The ridge-like region 43 of the compression sleeve 14 is fully compressed or "levelled". The slot-shaped recess 40 in the compression sleeve 14 is fully closed at this point of the process. Here, the axial end 15 (not shown in FIG. 3D) of the outer conductor 8 of the cable 3 is clamped between the plug-side axial end region 17 of the compression sleeve 14 and the stop face 16 of the stop element 13 without the presence of an air gap over the entire circumference of 360°.

In a second variant of the first embodiment of a plug connector 2 according to the invention according to FIGS. 4A and 4B, the compression sleeve 14 is formed without a slot-shaped recess 40. During the assembly process, the entire compression sleeve 14 is tilted. In the assembled state according to FIG. 4B, the longitudinal axis $L_P$ of the compression sleeve 14 is tilted by the tilt angle $\varphi_K$ relative to the longitudinal axis $L_A$ of the stop element 13 or the longitudinal axis $L_S$ of the plug connector 2. In order to bring about a tilting of the compression sleeve 14 during the assembly process, the cable-side end face of the compression sleeve 14, which forms the mating stop face 28 of the compression sleeve 14, has an incline $\varphi_A$ relative to the longitudinal axis $L_P$ of the compression sleeve 14 equal to the tilt angle $\varphi_K$, i.e. the normal vector $L_{KEP}$ of the mating stop face 28 of the compression sleeve 14 is rotated by the orientation angle $\varphi_A$ relative to the longitudinal axis $L_P$ of the compression sleeve 14. The fastening sleeve 22 which in the assembly process pushes by means of the stop face 27 against the mating stop face 28 of the compression sleeve 14, brings about a tilting of the compression sleeve 14 by the tilt angle $\varphi_K$ in the assembly process. In the assembled state, the mating stop face 28 of the compression sleeve 14 has an orientation parallel to the longitudinal axis $L_A$ of the stop element 13 for the longitudinal axis $L_S$ of the plug connector 2.

In addition, the plug-side end face 42 of the compression sleeve 14 has an incline $\varphi_A$ relative to the longitudinal axis $L_P$ of the compression sleeve 14 equal to the tilt angle $\varphi_K$, i.e. the normal vector $L_{SEP}$. The plug-side end face 42 of the compression sleeve 14 is rotated by the orientation angle $\varphi_A$ relative to the longitudinal axis $L_P$ of the compression sleeve 14.

As a result of the tilting of the compression sleeve 14 and as a result of the incline $\varphi_A$ of the plug-side end face 42 of the compression sleeve 14, the plug-side end region 17 of the compression sleeve 14 is pushed over the entire angular circumference of 360° against the stop face 16 of the conically shaped axial extension 18 of the stop element 13. The axial end 15 of the outer conductor 6 of the cable 3 is thus optimally clamped between the compression sleeve 14 and the stop element 13 over the entire angular circumference of 360° without the presence of an air gap. In order to allow a tilting of the compression sleeve 14 within the outer conductor contact element 9, the cable-side end region 21 of the sleeve-like outer conductor contact element 9 must preferably be formed shorter and with a larger inner diameter than in the first variant.

In a first variant of the second embodiment of a plug connector 2 according to the invention according to FIGS. 5A and 5B, a slot-shaped recess 44, preferably a slot-shaped recess 44 shaped as a through-bore, is formed in the stop element 13, equivalent later the first variant of the first embodiment of the invention. The forming of the slot-shaped recess 44 in the stop element 13 produces in the stop element 13, on the cable side, an axial end region 45 of the stop element 13 which has a certain elastic movability compared to the rest of the region of the stop element 13. In respect of the forming of the slot-shaped recess 44 in the stop element 13, the technical features already explained in relation to the slot-shaped recess 40 of the compression sleeve 14 are equivalent.

In addition, the cable-side end face 42 of the compression sleeve 14, as already explained in the two variants of the first embodiment of the invention, has an incline $\varphi_A$ relative to the longitudinal axis $L_P$ of the compression sleeve 14 equal to the tilt angle $\varphi_K$, i.e. the normal vector $L_{SEP}$ of the end face 42 of the compression sleeve 14 is rotated by the orientation angle $\varphi_A$ relative to the longitudinal axis $L_P$ of the compression sleeve 14.

As a result of the assembly process, the slot-shaped recess 44 in the stop element 13 is at least partly closed. The cable-side axial end region 45 of the stop element 13 is tilted by the tilt angle $\varphi_K$. In the assembled state of the plug connector 2, the longitudinal axis $L_{AEA}$ of the axial end region 45 of the stop element 13 is tilted relative to the longitudinal axis $L_S$ of the plug connector 2 or the longitudinal axis $L_P$ of the compression sleeve 14 by the tilt angle $\varphi_K$.

As a result of the tilting of the axial end region 45 of the stop element 13 and as a result of the incline $\varphi_A$ of the plug-side end face 42 of the compression sleeve 14, the plug-side axial end region 17 of the compression sleeve 14 is pushed over the entire angular circumference of 360° against the stop face 16 of the conically shaped axial extension 18 of the stop element 13. The axial end 15 of the outer conductor 6 of the cable 3 is thus clamped optimally between the compression sleeve 14 and the stop element 13 over the entire angular circumference of 360°, without the presence of an air gap.

In a second variant of the second embodiment of the invention according to FIGS. 6A and 6B, the stop element 13 is tilted during the assembly process by the tilt angle $\varphi_K$. In order to allow a tilting of the stop element 13 within the outer conductor contact element 9, the inner diameter of the outer conductor contact element 9 must be slightly increased and the end-face support face of the stop element 13 on the outer conductor contact element 9 must be designed with an incline.

The plug-side end face 42 of the compression sleeve 14 likewise has an incline $\varphi_A$ relative to the longitudinal axis $L_P$ of the compression sleeve 14 equal to the tilt angle $\varphi_K$, i.e. the normal vector $L_{SEP}$ of the end face 42 of the compression sleeve 14 is rotated by the orientation angle $\varphi_A$ relative to the longitudinal axis $L_P$ of the compression sleeve 14. The stop element 13 is tilted in that the plug-side axial end region 17 of the compression sleeve 14 pushes against the stop face 16 of the stop element 13.

As a result of the tilting of the stop element 13 and as a result of the incline $\varphi_A$ of the plug-side end face 42 of the compression sleeve 14, the plug-side axial end region 17 of the compression sleeve 14 is pushed over the entire angular circumference of 360° against the stop face 16 of the conically shaped axial extension 18 of the stop element 13. The axial end 15 of the outer conductor 6 of the cable 3 is thus clamped optimally between the compression sleeve 14 and the stop element 13 over the entire angular circumference of 360°, without the presence of an air gap.

In a third embodiment of the invention according to FIGS. 7A and 7B, the plane 46 which is spanned by an edge 47 between the end face, i.e. the stop face 16 and the inner lateral surface 48 of the stop element 13, has an incline $\varphi_A$ equal to the tilt angle $\varphi_K$, i.e. the normal vector $L_{KEA}$ of this plane 46 is rotated by the orientation angle $\varphi_A$ relative to the longitudinal axis $L_S$ of the plug connector 2 or the longitudinal axis $L_P$ of the compression sleeve 14 or the longitudinal axis $L_A$ of the stop element 13.

The plug-side end face 42 of the compression sleeve 14 likewise has an incline $\varphi_A$ equal to the tilt angle $\varphi_K$, i.e. the normal vector $L_{SEP}$ of the cable side end face 42 of the compression sleeve 14 is rotated by the orientation angle $\varphi_A$ relative to the longitudinal axis $L_S$ of the plug connector 2 or the longitudinal axis $L_P$ of the compression sleeve 14 or the longitudinal axis $L_A$ of the stop element 13.

Due to the identical incline $\varphi_A$ of the plug-side end face 42 of the compression sleeve 14 and the plane 46, the plug-side end region 17 of the compression sleeve 14 is pushed against the stop face 16 of the conically shaped axial extension 18 of the stop element 1 over the entire angular circumference of 360°. The axial end 15 of the outer conductor 6 of the cable 3 is thus clamped optimally between the compression sleeve 14 and the stop element 13 over the entire angular circumference of 360°, without the presence of an air gap.

Instead of the inclined plug-side end face 42 of the compression sleeve 14, a plug-side end face 42 of the compression sleeve 14 of which the normal vector $L_{SEP}$ is directed along the longitudinal axis $L_S$ of the plug connector 2 and on which there is formed a ridge-like region 43 in a certain angular range can also be used alternatively in the individual variants and embodiments of the invention.

In a fourth embodiment of the invention according to FIGS. 8A to 8C, the edge 47 between the end face, i.e. the stop face 16, and the inner lateral surface 48 of the stop element 13, in the direction of the longitudinal axis $L_S$ of the plug connector 2 has a helical course, which corresponds to the helical course of the thread turn or the inner lateral surface 19 of the compression sleeve 14. In the assembled state of the plug connector assembly 1 according to FIG. 8B, the conically shaped region of the stop face 16 of the stop element 13 thus runs parallel to the tooth flank face of the foremost turn of the internal thread formed in the compression sleeve 14. The stop face 16 of the stop element 13 preferably has a conical flank.

The axial end 15 of the outer conductor 6 of the cable 3 is thus clamped with constant contact pressure over the entire angular circumference of 360° between the axial end region 17 of the compression sleeve 14 and the stop face 16 of the stop element 13.

Although the present invention has been described above in full with reference to preferred exemplary embodiments, it is not limited to these and can be modified in a variety of ways.

Operation

Having described the structure of our Electrical Plug Connector, Connecting Element, and Printed Circuit Board Arrangement, its operation is briefly described.

A principal object of the present invention is an electrical plug connector (2) for a cable (3), having an outer conductor (6) that has an outer lateral surface (20) and an axial end (15), the electrical plug connector (2) comprising: a compression sleeve (14) having a longitudinal axis, an axial end region (41), and an inner lateral surface (19), and the inner lateral surface (19) of the compression sleeve (14) is shaped in the form of a thread that is configured to be threadably engaged with a thread formed in the outer lateral surface (2) of the outer conductor (6) of the cable (3); a stop element (13) that is connected to the compression sleeve (14), the stop element (13) having a longitudinal axis and an axial end region (45), and the axial end region (45) of the stop element (13) is axially adjacent the axial end region (41) of the compression sleeve (14) in an insertion direction of the electrical plug connector (2); and wherein the axial end (15) of the outer conductor (6) of the cable (3) is clampable between the axial end region (41) of the compression sleeve (14) and the adjacent axial end region (45) of the stop element (13); and wherein in an assembled state of the plug connector (2) and the cable (3), the longitudinal axis, of the compression sleeve (14), at least in the axial end region (41) of the compression sleeve (14), is tilted by a tilt angle ($\varphi_K$) relative to the longitudinal axis of the stop element (13) at least in the axial end region (45) of the stop element (13).

A further object of the present invention is an electrical plug connector (2) and wherein the axial end region (45) of the stop element (13) is formed with a tapering diameter.

A further object of the present invention is an electrical plug connector (2) and wherein the tilt angle ($\varphi_K$) lies in an angular range of +/−20% of a pitch angle of a thread path of the inner lateral surface (19) of the compression sleeve (14) that is shaped in the form of the thread.

A further object of the present invention is an electrical plug connector (2) and further comprising: a plug-side end face (42) of the compression sleeve (14); and a normal vector of [ ] the plug-side end face (42) of the compression sleeve (14), to the longitudinal axis of the compression sleeve (14), is rotated by an orientation angle ($\varphi_A$).

A further object of the present invention is an electrical plug connector (2) and wherein, a region, preferably a ridge-like region (43), of the axial end region (41) of the compression sleeve (14) is axially compressed when the plug connector (2) and the cable (3) are in an assembled state.

A further object of the present invention is a electrical plug connector (2) and wherein the longitudinal axis of the compression sleeve (14), at least in the axial end region (41) of the compression sleeve (14), is tilted relative to a longitudinal axis of the electrical plug connector (2).

A further object of the present invention is an electrical plug connector (2) and further comprising: as slot-shaped recess (40) defined in the compression sleeve (14).

A further object of the present invention is an electrical plug connector (2) and further comprising: a longitudinal extent of the slot-shaped recess (40) defined in the compression sleeve (14) is formed along the thread path, preferably along a thread valley of the thread path.

A further object of the present invention is an electrical plug connector (2) and wherein the slot-shaped recess (40) of the compression sleeve (14) is formed as a through-bore or as a blind bore.

A further object of the present invention is an electrical plug connector (2) and wherein the longitudinal axis of the entire compression sleeve (14) is tilted relative to the longitudinal axis of the electrical plug connector (2).

A further object of the present invention is an electrical plug connector (2) and wherein, the longitudinal axis of the stop element (13), at least in the axial end region (45) of the stop element (13), is tilted relative to a longitudinal axis of the electrical plug connector (2).

A further object of the present invention is an electrical plug connector (2) and further comprising: a slot-shaped recess (44) defined in the stop element (13).

A further object of the present invention is an electrical plug connector (2) and wherein the longitudinal axis of the entire stop element (13) is tilted relative to the longitudinal axis of the electrical plug connector (2).

A further object of the present invention is an electrical plug connector assembly comprising: an electrical plug connector (2) having a longitudinal axis; a cable (3), having an outer conductor (6) that has an outer lateral surface (20), and an axial end (15); a compression sleeve (14) that defines a through bore, slot-shaped recess (44) and having a longitudinal axis, an axial end region (41), a plug-side end face (42), and an inner lateral surface (19), and the inner lateral surface (19) of the compression sleeve (14) is shaped in the form of a thread that is configured to threadably engage with a thread formed in the outer lateral surface (2) of the outer conductor (6) of the cable (3); a stop element (13) that is connected to the compression sleeve (14), the stop element (13) having a longitudinal axis and an axial end region (45) that has an end face (16), and a slot-shaped recess (44), and the axial end region (45) end face (16) of the stop element (13) is formed with a tapering diameter and is axially adjacent the axial end region (41) of the compression sleeve (14) in an insertion direction of the electrical plug connector (2); and wherein the axial end (15) of the outer conductor (6) of the cable (3) is clampable between the axial end region (41) of the compression sleeve (14) and the adjacent axial end region (45) of the stop element (13); and wherein in an assembled state of the plug connector assembly, the longitudinal axis of the compression sleeve (14), at least in the axial end region (41) of the compression sleeve (14), is tilted by a silt angle ($\varphi_K$) relative to the longitudinal axis of the stop element (13) at least in the axial end region (45) of the stop element (13); and wherein the outer lateral surface (20) of the outer conductor (6) of the cable (3) is threaded into the compression sleeve (14) of the electrical plug connector (2).

A further object of the present invention is an electrical plug connector (2) for a cable (3 having an outer conductor (6) that has an outer lateral surface (20) and an axial end (15), the electrical plug connector (2) comprising: a compression sleeve (14), having a longitudinal axis, an axial end region (41), and an inner lateral surface (19), and the inner lateral surface (19) of the compression sleeve (14) is shaped in the form of a thread that is configured to be threadably engaged with a thread formed in the outer lateral surface (2) of the outer conductor (6) of the cable (3); a stop element (13) that is connected to the compression sleeve (14), the stop element (13) having, a longitudinal axis, and an inner lateral surface (48), and an end face (16), and an axial end region (45) proximate the end face (16), and the axial end region (45) of the stop element (13) is axially adjacent to the axial end region (41) of the compression sleeve (14) in an insertion direction of the electrical plug connector (2); and wherein the axial end (15) of the outer conductor (6) is clampable between the axial end region (41) of the compression sleeve (14) and the adjacent axial end region (45) of the stop element (13); and a normal vector of a plane (46) which is spanned by an edge (47) between the end face (16) of the stop element (13) and the inner lateral surface (48) of the stop element (13) is rotated by an orientation angle ($\varphi_A$) relative to the longitudinal axis of the compression sleeve (14).

A further object of the present invention is an electrical plug connector (2) for a cable (3) having an outer conductor (6) that has an outer lateral surface (20) and an axial end (15), the electrical plug connector (2) comprising: a compression sleeve (14) having a longitudinal axis, an axial end region (41), and an inner lateral surface (19), and the inner lateral surface (19) of the compression sleeve (14) is shaped in the form of a thread that is configured to be threadably engaged with a thread formed in the outer lateral surface (2) of the outer conductor (6) of the cable (3); a stop element (13) that is connected to the compression sleeve (14), the stop element (13) having, a longitudinal axis, and an inner lateral surface (48), and an end face (16), and an axial end region (45) proximate the end face (16), and the axial end region (45) of the stop element (13) is axially adjacent to the axial end region (41) of the compression sleeve (14) in an insertion direction of the electrical plug connector (2); and wherein the axial end (15) of the outer conductor (6) is clampable between the axial end region (41) of the compression sleeve (14) and the adjacent axial end region (45) of the stop element (13); and a normal vector of a plane (46) which is spanned by an edge (47) between the end face (16) of the stop element (13) and the inner lateral surface (48) of the stop element (13), the edge (47) having a helical course in a longitudinal axis direction of the plug connector (2).

A further object of the present invention is an electrical plug connector (2) and further comprising: a to extent of the slot-shaped recess (40) defined in the compression sleeve (14) is formed normal to the longitudinal axis of the compression sleeve (14).

A still further object of the present invention is an electrical plug connector assembly comprising: an electrical plug connector (2) having a longitudinal axis: a cable (3) having an outer conductor (6) that has an outer lateral surface (20), and an axial end (15; a compression sleeve (14), that defines a through bore, slot-shaped recess (44) and having a longitudinal axis, an axial end region (41), and an inner lateral surface (19), and the inner lateral surface (19) of the compression sleeve (14) is shaped in the form of a thread that is configured to be threadably engaged with a thread formed in the outer lateral surface (2) of the outer conductor (6) of the cable (3); and a stop element (13) that is connected to the compression sleeve (14), the stop element (13) having, a longitudinal axis, and a slot-shaped recess, and an inner lateral surface (48), and an axial end region (45) that has a tapering diameter, and the axial end region (45) end face (16) of the stop element (13) is axially adjacent to the axial end region (41) of the compression sleeve (14) in an insertion direction of the electrical plug connector (2); and wherein the axial end (15) of the outer conductor (6) is clampable between the axial end region (41) of the compression sleeve (14) and the adjacent axial end region (45) of the stop element (13); and wherein a normal vector of a plane (46) which is spanned by an edge (47) between the end face (16) of the stop element (13) and the inner lateral surface (48) of the stop element (13) is rotated by an orientation angle ($\varphi_A$) relative to the longitudinal axis of the compression sleeve (14).

An even still further object of the present invention is an electrical plug connector assembly comprising: an electrical plug connector (2) having a longitudinal axis: a cable (3) having an outer conductor (6) that has an outer lateral surface (20), and an axial end (15; a compression sleeve (14), that defines a through bore, slot-shaped recess (44) and having a longitudinal axis, an axial end region (41), and an inner lateral surface (19), and the inner lateral surface (19) of the compression sleeve (14) is shaped in the form of a thread that is configured to be threadably engaged with a thread formed in the outer lateral surface (2) of the outer conductor (6) of the cable (3); and a stop element (13) that is connected to the compression sleeve (14), the stop element (13) having, a longitudinal axis, and a slot-shaped recess, and an inner lateral surface (48), and an axial end region (45) that has a tapering diameter, and the axial end region (45) end face (16) of the stop element (13) is axially adjacent to the axial end region (41) of the compression sleeve (14) in an insertion direction of the electrical plug connector (2); and wherein the axial end (15) of the outer conductor (6) is clampable between the axial end region (41) of the compression sleeve (14) and the adjacent axial end region (45) of the stop element (13); and wherein a normal vector of a plane (46) which is spanned by an edge (47) between the end face (16) of the stop element (13) and the inner lateral surface (48) of the stop element (13), the edge (47) having a helical course in a longitudinal axis direction of the plug connector (2).

In compliance with the statute, the present invention has been described in language more or less specific, as to structural and methodical features. It is to be understood, however, that the invention is not limited to the specific features shown and described since the means herein disclosed comprise preferred forms of putting the invention into effect. The invention is, therefore, claimed in any of its forms or modifications within the proper scope of the appended claims appropriately interpreted in accordance with the Doctrine of Equivalents.

The invention claimed is:

1. An electrical plug connector (2) for a cable (3) for high-frequency transmission of signals, having an outer conductor (6) that has an outer lateral surface (20) and an axial end (15), the electrical plug connector (2) comprising:

a compression sleeve (14) having a longitudinal axis, an axial end region (41), and an inner lateral surface (19), and the inner lateral surface (19) of the compression sleeve (14) is shaped in the form of a thread that is configured to be threadably engaged with a thread formed in the outer lateral surface (2) of the outer conductor (6) of the cable (3);

a stop element (13) that is connected to the compression sleeve (14), the stop element (13) having a longitudinal axis and an axial end region (45), and the axial end region (45) of the stop element (13) is axially adjacent the axial end region (41) of the compression sleeve (14) in an insertion direction of the electrical plug connector (2); and wherein the axial end (15) of the outer conductor (6) of the cable (3) is clampable between the axial end region (41) of the compression sleeve (14) and the adjacent axial end region (45) of the stop element (13) so as to create a direct physical contact between the outer conductor (6) and the stop element (13) for making an electrical contact between the outer conductor (6) and the stop element (13); and wherein in an assembled state of the plug connector (2) and the cable (3), the longitudinal axis of the compression sleeve (14), at least in the axial end region (41) of the compression sleeve (14), is tilted by a tilt angle ($\phi_K$) relative to the longitudinal axis of the stop element (13) at least in the axial end region (45) of the stop element (13).

2. The electrical plug connector (2) as claimed in claim 1 and wherein the axial end region (45) of the stop element (13) is formed with a tapering diameter.

3. The electrical plug connector (2) as claimed in claim 1 and wherein the tilt angle ($\phi_K$) lies in an angular range of +/−20% of a pitch angle of a thread path of the inner lateral surface (19) of the compression sleeve (14) that is shaped in the form of the thread.

4. The electrical plug connector (2) as claimed in claim 3 and further comprising:

a plug-side end face (42) of the compression sleeve (14); and a normal vector of the plug-side end face (42) of the compression sleeve (14), to the longitudinal axis of the compression sleeve (14), is rotated by an orientation angle ($\phi_A$).

5. The electrical plug connector (2) as claimed in claim 1 and wherein, a region, preferably a ridge-like region (43), of the axial end region (41) of the compression sleeve (14) is axially compressed when the plug connector (2) and the cable (3) are in an assembled state.

6. The electrical plug connector (2) as claimed in claim 3 and wherein the longitudinal axis of the compression sleeve (14), at least in the axial end region (41) of the compression sleeve (14), is tilted relative to a longitudinal axis of the electrical plug connector (2).

7. The electrical plug connector (2) as claimed in claim 6 and further comprising:

a slot-shaped recess (40) defined in the compression sleeve (14).

8. The electrical plug connector (2) as claimed in claim 7 and further comprising:
a longitudinal extent of the slot-shaped recess (40) defined in the compression sleeve (14) is formed along the thread path, preferably along a thread valley of the thread path.

9. The electrical plug connector (2) as claimed in claim 7 and wherein the slot-shaped recess (40) of the compression sleeve (14) is formed as a through-bore or as a blind bore.

10. The electrical plug connector (2) as claimed in claim 6 and wherein the longitudinal axis of the entire compression sleeve (14) is tilted relative to the longitudinal axis of the electrical plug connector (2).

11. The electrical plug connector (2) as claimed in claim 3 and wherein, the longitudinal axis of the stop element (13), at least in the axial end region (45) of the stop element (13), is tilted relative to a longitudinal axis of the electrical plug connector (2).

12. The electrical plug connector (2) as claimed in claim 11 and further comprising:
a slot-shaped recess (44) defined in the stop element (13).

13. The electrical plug connector (2) as claimed in claim 11 and wherein the longitudinal axis of the entire stop element (13) is tilted relative to the longitudinal axis of the electrical plug connector (2).

14. The electrical plug connector (2) as claimed in claim 7 and further comprising:
a longitudinal extent of the slot-shaped recess (40) defined in the compression sleeve (14) is formed normal to the longitudinal axis of the compression sleeve (14).

15. An electrical plug connector assembly for high-frequency transmission of signals, the electrical plug connector assembly comprising:
an electrical plug connector (2) having a longitudinal axis;
a cable (3) for high-frequency transmission of signals having an outer conductor (6) that has an outer lateral surface (20), and an axial end (15);
a compression sleeve (14) that defines a through bore, slot-shaped recess (44) and having a longitudinal axis, an axial end region (41), a plug-side end face (42), and an inner lateral surface (19), and the inner lateral surface (19) of the compression sleeve (14) is shaped in the form of a thread that is configured to threadably engage with a thread formed in the outer lateral surface (2) of the outer conductor (6) of the cable (3);
a stop element (13) that is connected to the compression sleeve (14), the stop element (13) having a longitudinal axis and an axial end region (45) that has an end face (16), and a slot-shaped recess (44), and the axial end region (45) end face (16) of the stop element (13) is formed with a tapering diameter and is axially adjacent the axial end region (41) of the compression sleeve (14) in an insertion direction of the electrical plug connector (2); and wherein
the axial end (15) of the outer conductor (6) of the cable (3) is clampable between the axial end region (41) of the compression sleeve (14) and the adjacent axial end region (45) of the stop element (13) so as to create a direct physical contact between the outer conductor (6) and the stop element (13) for making an electrical contact between the outer conductor (6) and the stop element (13); and wherein
in an assembled state of the plug connector assembly, the longitudinal axis of the compression sleeve (14), at least in the axial end region (41) of the compression sleeve (14), is tilted by a tilt angle ($\phi_K$) relative to the longitudinal axis of the stop element (13) at least in the axial end region (45) of the stop element (13); and wherein
the outer lateral surface (20) of the outer conductor (6) of the cable (3) is threaded into the compression sleeve (14) of the electrical plug connector (2).

16. An electrical plug connector (2) for a cable (3) for high-frequency transmission of signals having an outer conductor (6) that has an outer lateral surface (20) and an axial end (15), the electrical plug connector (2) comprising:
a compression sleeve (14), having a longitudinal axis, an axial end region (41), and an inner lateral surface (19), and the inner lateral surface (19) of the compression sleeve (14) is shaped in the form of a thread that is configured to be threadably engaged with a thread formed in the outer lateral surface (2) of the outer conductor (6) of the cable (3);
a stop element (13) that is connected to the compression sleeve (14), the stop element (13) having,
a longitudinal axis, and
an inner lateral surface (48), and
an end face (16), and
an axial end region (45) proximate the end face (16), and the axial end region (45) of the stop element (13) is axially adjacent to the axial end region (41) of the compression sleeve (14) in an insertion direction of the electrical plug connector (2); and wherein
the axial end (15) of the outer conductor (6) is clampable between the axial end region (41) of the compression sleeve (14) and the adjacent axial end region (45) of the stop element (13) so as to create a direct physical contact between the outer conductor (6) and the stop element (13) for making an electrical contact between the outer conductor (6) and the stop element (13); and
a normal vector of a plane (46) which is spanned by an edge (47) between the end face (16) of the stop element (13) and the inner lateral surface (48) of the stop element (13) is rotated by an orientation angle ($\phi_A$) relative to the longitudinal axis of the compression sleeve (14).

17. An electrical plug connector (2) for a cable (3) for high-frequency transmission of signals having an outer conductor (6) that has an outer lateral surface (20) and an axial end (15), the electrical plug connector (2) comprising:
a compression sleeve (14) having a longitudinal axis, an axial end region (41), and an inner lateral surface (19), and the inner lateral surface (19) of the compression sleeve (14) is shaped in the form of a thread that is configured to be threadably engaged with a thread formed in the outer lateral surface (2) of the outer conductor (6) of the cable (3);
a stop element (13) that is connected to the compression sleeve (14), the stop element (13) having,
a longitudinal axis, and
an inner lateral surface (48), and
an end face (16), and
an axial end region (45) proximate the end face (16), and the axial end region (45) of the stop element (13) is axially adjacent to the axial end region (41) of the compression sleeve (14) in an insertion direction of the electrical plug connector (2); and wherein
the axial end (15) of the outer conductor (6) is clampable between the axial end region (41) of the compression sleeve (14) and the adjacent axial end region (45) of the stop element (13) so as to create a direct physical contact between the outer conductor (6) and the stop element (13) for making an electrical contact between the outer conductor (6) and the stop element (13); and a normal vector of a plane (46) which is spanned by an edge (47) between the end face (16) of the stop element (13) and the inner lateral surface (48) of the stop element (13), the edge (47) having a helical course in a longitudinal axis direction of the plug connector (2).

18. An electrical plug connector assembly for high-frequency transmission of signals comprising:

an electrical plug connector (2) having a longitudinal axis:

a cable (3) for high-frequency transmission of signals having an outer conductor (6) that has an outer lateral surface (20), and an axial end (15;

a compression sleeve (14), that defines a through bore, slot-shaped recess (44) and having a longitudinal axis, an axial end region (41), and an inner lateral surface (19), and the inner lateral surface (19) of the compression sleeve (14) is shaped in the form of a thread that is configured to be threadably engaged with a thread formed in the outer lateral surface (2) of the outer conductor (6) of the cable (3); and a stop element (13) that is connected to the compression sleeve (14), the stop element (13) having, a longitudinal axis, and a slot-shaped recess, and an inner lateral surface (48), and an axial end region (45) that has a tapering diameter, and the axial end region (45) end face (16) of the stop element (13) is axially adjacent to the axial end region (41) of the compression sleeve (14) in an insertion direction of the electrical plug connector (2); and wherein the axial end (15) of the outer conductor (6) is clampable between the axial end region (41) of the compression sleeve (14) and the adjacent axial end region (45) of the stop element (13) so as to create a direct physical contact between the outer conductor (6) and the stop element (13) for making an electrical contact between the outer conductor (6) and the stop element (13); and wherein a normal vector of a plane (46) which is spanned by an edge (47) between the end face (16) of the stop element (13) and the inner lateral surface (48) of the stop element (13) is rotated by an orientation angle (4A) relative to the longitudinal axis of the compression sleeve (14).

19. An electrical plug connector assembly for high-frequency transmission of signals comprising:

an electrical plug connector (2) having a longitudinal axis:

a cable (3) for high-frequency transmission of signals having an outer conductor (6) that has an outer lateral surface (20), and an axial end (15;

a compression sleeve (14), that defines a through bore, slot-shaped recess (44) and having a longitudinal axis, an axial end region (41), and an inner lateral surface (19), and the inner lateral surface (19) of the compression sleeve (14) is shaped in the form of a thread that is configured to be threadably engaged with a thread formed in the outer lateral surface (2) of the outer conductor (6) of the cable (3); and a stop element (13) that is connected to the compression sleeve (14), the stop element (13) having, a longitudinal axis, and a slot-shaped recess, and an inner lateral surface (48), and an axial end region (45) that has a tapering diameter, and the axial end region (45) end face (16) of the stop element (13) is axially adjacent to the axial end region (41) of the compression sleeve (14) in an insertion direction of the electrical plug connector (2); and wherein the axial end (15) of the outer conductor (6) is clampable between the axial end region (41) of the compression sleeve (14) and the adjacent axial end region (45) of the stop element (13) so as to create a direct physical contact between the outer conductor (6) and the stop element (13) for making an electrical contact between the outer conductor (6) and the stop element (13); and wherein a normal vector of a plane (46) which is spanned by an edge (47) between the end face (16) of the stop element (13) and the inner lateral surface (48) of the stop element (13), the edge (47) having a helical course in a longitudinal axis direction of the plug connector (2).

* * * * *